(12) United States Patent
Dai et al.

(10) Patent No.: US 10,541,593 B2
(45) Date of Patent: Jan. 21, 2020

(54) AC PERMANENT-MAGNET SWITCHED RELUCTANCE MOTOR

(71) Applicant: Shanshan Dai, Nanjing, Jiangsu (CN)

(72) Inventors: Shanshan Dai, Nanjing (CN); Shizhu Zhu, Nanjing (CN); Zhanfeng Ying, Nanjing (CN); Kai Feng, Nanjing (CN); Meng Wan, Nanjing (CN)

( * ) Notice: Subject to any disclaimer, the term of this patent is extended or adjusted under 35 U.S.C. 154(b) by 658 days.

(21) Appl. No.: 15/038,082

(22) PCT Filed: Nov. 19, 2014

(86) PCT No.: PCT/CN2014/091693
§ 371 (c)(1),
(2) Date: Nov. 14, 2016

(87) PCT Pub. No.: WO2015/074571
PCT Pub. Date: May 28, 2015

(65) Prior Publication Data
US 2017/0104402 A1    Apr. 13, 2017

(30) Foreign Application Priority Data

Nov. 20, 2013 (CN) .......................... 2013 1 0584450
Nov. 20, 2013 (CN) .......................... 2013 1 0584522

(51) Int. Cl.
*H02K 1/06* (2006.01)
*H02K 37/14* (2006.01)
(Continued)

(52) U.S. Cl.
CPC ............. *H02K 37/14* (2013.01); *H02K 1/141* (2013.01); *H02K 3/18* (2013.01)

(58) Field of Classification Search
CPC ........... H02K 1/141; H02K 3/18; H02K 37/14
(Continued)

(56) References Cited

U.S. PATENT DOCUMENTS 5,696,419 A * 12/1997 Rakestraw ............. H02K 21/24
290/43
6,717,313 B1 * 4/2004 Bae ........................ H02K 21/12
310/156.02
(Continued)

FOREIGN PATENT DOCUMENTS

CN       101860159 A      10/2010
CN       102624183 A       8/2012
(Continued)

OTHER PUBLICATIONS

Feb. 17, 2015 Search Report issued in International Patent Application No. PCT/CN2014/091693.
(Continued)

*Primary Examiner* — Hanh N Nguyen
(74) *Attorney, Agent, or Firm* — Oliff PLC

(57) ABSTRACT

On an AC permanent magnet switched reluctance motor stator seat, "C-shaped" or "U-shaped" excitation salient pole pairs or compound excitation salient pole pairs are set up in a balanced way. Excited by excitation current, the permanent magnet flux of compound excitation salient pole pair is imported into the main loop of excitation flux to form compound excitation magnetic potential. On the rotor support, permanent magnets are fixed at the same interval, and the magnetic polarity of neighboring permanent magnets on a same rotating surface is different. When the rotating shaft rotates, two magnet pole faces of each permanent magnet on rotor support will be dead against the two ports of each excitation salient pole pair on the stator, forming a closed magnetic loop with air gap.

3 Claims, 19 Drawing Sheets

(51) Int. Cl.
*H02K 1/14* (2006.01)
*H02K 3/18* (2006.01)

(58) Field of Classification Search
USPC .......................................... 310/216.023, 266
See application file for complete search history.

(56) References Cited

U.S. PATENT DOCUMENTS

| | | | | |
|---|---|---|---|---|
| 2004/0207281 | A1* | 10/2004 | Detela | H02K 11/01 |
| | | | | 310/162 |
| 2011/0109190 | A1* | 5/2011 | Aoyama | H02K 1/141 |
| | | | | 310/216.074 |
| 2014/0084715 | A1* | 3/2014 | Yuan | H02K 41/03 |
| | | | | 310/46 |
| 2014/0265745 | A1* | 9/2014 | Maki-Ontto | H02K 1/141 |
| | | | | 310/68 D |

FOREIGN PATENT DOCUMENTS

| | | |
|---|---|---|
| CN | 102946181 A | 2/2013 |
| CN | 103560633 A | 2/2014 |
| CN | 103595213 A | 2/2014 |

OTHER PUBLICATIONS

Feb. 17, 2015 Written Opinion issued in International Patent Application No. PCT/CN2014/091693.

* cited by examiner

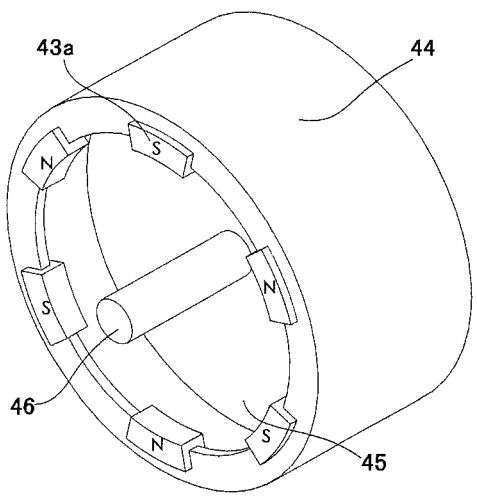
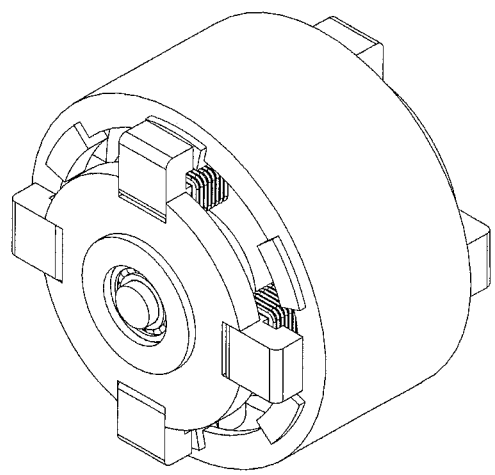
Fig. 19　　　　　　　　　Fig. 20
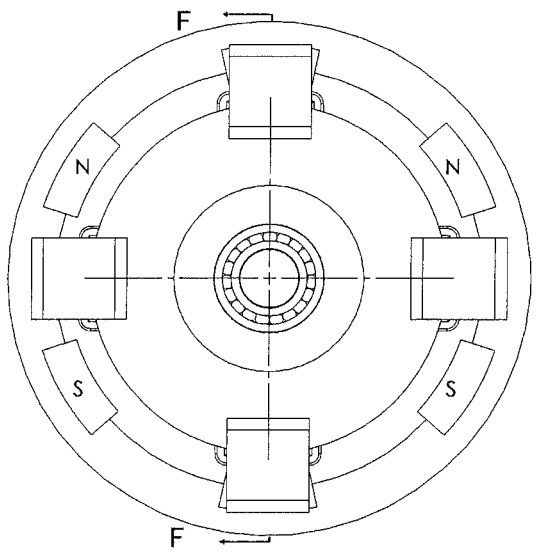
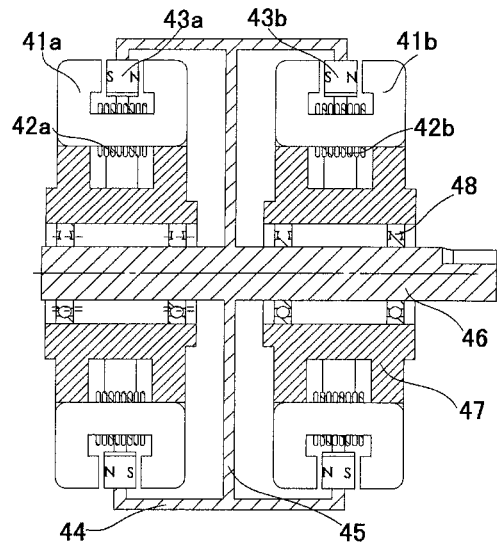
Fig. 21　　　　　　　　　Fig. 22
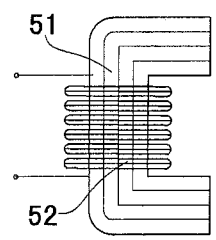
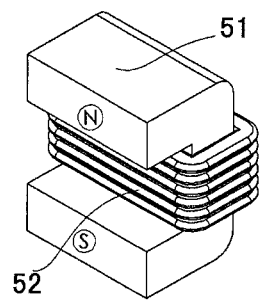
Fig. 23　　　　　　　　　Fig. 24

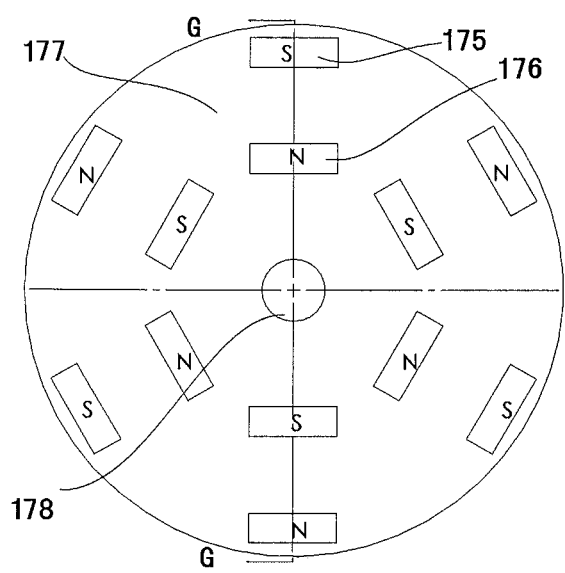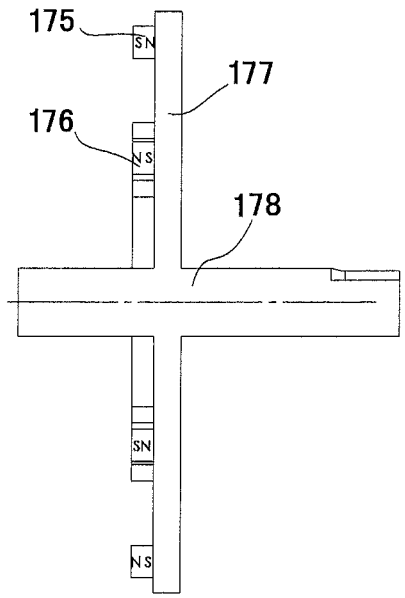
Fig. 73  Fig. 74
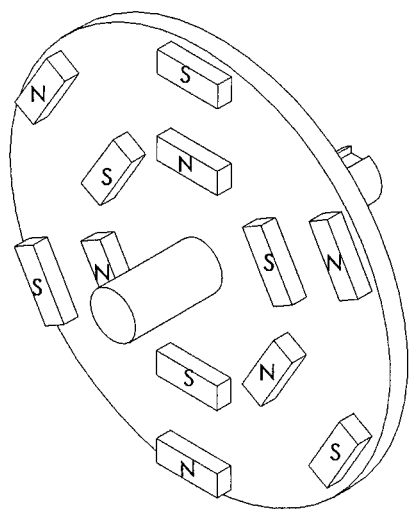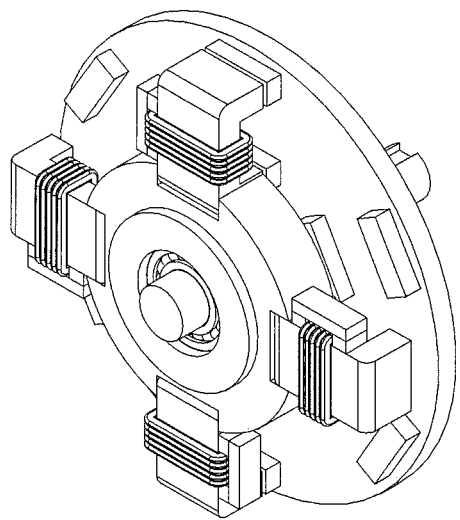
Fig. 75  Fig. 76

AC PERMANENT-MAGNET SWITCHED RELUCTANCE MOTOR

TECHNICAL FIELD

The invention relates to a switched reluctance motor, especially a switched reluctance motor with high power density, and an AC Permanent-Magnet Synergistic Reluctance Motor which could realize the compound utilization of permanent magnet flux and excitation flux.

BACKGROUND TECHNOLOGY

Electric motor is a product of large quantity and broad coverage. It covers every field of national economy, such as industry and agriculture, transportation, aerospace, military industry and national defense, commerce and family, etc., and has become an important foundation for absolutely most mechanical driving methods and industrial modernization. The performance of electric motor is directly related to the benefits of national economy, energy consumption, and protection of ecological environment, so aspiring after an excellent motor of high efficiency, low consumption, being stable and reliable and easy to control, and low price has become an objective that the motor research institutions and experts, and engineering technical personnel of each country in the world work for and aspire after. Along with the appearance of the rare-earth permanent-magnet material, the permanent-magnet motor has developed very quickly in every field, but multiple potentials of permanent magnetic energy has not been sufficiently excavated and applied.

Switched reluctance motor is a motor which has enjoyed fast technical development and increasingly broad application recently. The concept of the traditional switched reluctance motor has been broken through constantly, and the mechanical structure and the driving control mechanism of the traditional switched reluctance motor have also been improved and innovated constantly. In China's patent applications CN102214979A and CN102299604A, the structure of "independent excitation salient pole pair" was published for the first time, and "independent excitation salient pole pair" was combined with "rotor iron core salient pole pair" combined with or "rotor permanent-magnet salient pole pair", forming a new motor of unique structure, and opening a brand-new world of such motor. How to add the permanent magnet to the stator excitation salient pole pair unit of such motor and to use the intrinsic magnetic energy of permanent magnet sufficiently will become a new exploration and new breakthrough of such motor. This new motor changes the structure of the original permanent magnet motor that all coilers share one magnetic circuit to the unit structure "excitation salient pole pair" in which each coil is independent, each "excitation salient pole pair" is mutually independent, magnet-insulated, and interference-free, and each coil could realize independent communication control. This greatly reduces magnetic circuit, lowers the interference and magnet leakage of common magnetic circuit, and raises power density and equipment utilization ratio. Such new motor will increasingly become a new favorite and best one of switched reluctance motors. How to design, research and develop a practical motor suitable for various types based on the structural principle of such new motor is just a new subject faced by the designers and manufacturing enterprises of motors, in order to meet the demand of different application occasions.

INVENTION CONTENT

The first objective of the invention is to provide a switched reluctance motor of novel structure, combining the stator having "independent excitation salient pole pair" and the rotor having cantilever support structure, compressing the axial size of motor rotor, in order to meet the requirements of certain occasions on motor installation size.

The second objective of this invention is to provide a reluctance motor with compound excitation salient pole pair adopted for a stator, and through a combined design of permanent magnet and its module, as well as the independent excitation salient pole pair on the stator, to make the magnetic flux of permanent magnet and its module imported into the excitation flux of the excitation salient pole pair on the stator, jointly act on the rotor, forming a permanent-magnet synergistic, and make the motor generate greater rotating torque.

The third objective of this invention is to adopt reluctance motor of compound excitation salient pole pair structure and provide an excitation control method for the stator.

In order to realize the abovementioned first objective of invention, the first embodiment of this invention is: the invention relates to an AC permanent magnet switched reluctance motor. It consists of a stator and rotor. The stator consists of multiple excitation salient pole pairs, which are fixed on the stator seat in a balanced way; each excitation salient pole pair consists of laminated iron core and excitation coil; all excitation salient pole pairs are mutually magnet-isolated, and each excitation salient pole pair is excited and controlled by an independent excitation coil. It is featured by that the said excitation salient pole pair consists of "C-SHAPED" laminated iron core and excitation coil, and the ports of the two salient poles of this "C-shaped" laminated iron core are opposite. The said rotor consists of a rotating shaft, rotor support and multiple permanent magnets. The center of the rotor support is fixed with the rotating shaft, multiple permanent magnets are fixed at the outer edge of the rotor support at equal interval, and the magnetic polarity of neighboring permanent magnets on a same rotating surface are different. When the rotating shaft rotates, the permanent magnets fixed at the outer edge of the rotor support could pass through the two port faces of each excitation salient pole pair on the stator in turn, and an air gap will be formed between the two magnetic pole faces of each permanent magnet and the port faces of each excitation salient pole pair. When the permanent magnet is located between the two port faces of each excitation salient pole pair, a closed magnetic loop with air gap will be formed between the permanent magnet and the excitation salient pole pair.

In the abovementioned first embodiment, the said rotor support consists of a disc and a cylinder; the edge of one end is fixedly connected with the outside edge of the disc, forming a "bowl-shaped" entity. The center of the disc is fixedly connected with the rotating shaft, the plane of the disc is vertical to the axial line of the rotating shaft, and the axial line of the cylinder is superposed with the axial line of the rotating shaft. Multiple permanent magnets are fixed at the end of another end of the cylinder in a balanced way, and the magnetic polarity of neighboring permanent magnets are different. When the rotating shaft rotates, all the permanent magnets fixed at the edge of one end of the cylinder will be able to pass from between the ports of stator excitation salient pole pair, and an air gap will be formed between the two magnetic pole faces of each permanent magnet and the port face of the excitation salient pole pair.

In the abovementioned first embodiment, the said rotor support consists of a disc and a cylinder. The inner wall of the middle part of the cylinder is fixedly connected with the outside edge of the disc, forming a "same-bottom, dual-direction, opening and bowl-shaped" entity. The center of the disc is fixedly connected with the rotating shaft, the plane of the disc is vertical to the axial line of the rotating shaft, and the axial line of the cylinder is superposed with the axial line of the rotating shaft. Multiple permanent magnets are fixed at the edges of two ends of the cylinder in a balanced way, and moreover, the magnetic polarity of neighboring permanent magnets at a same end edge are different, the magnetic polarity of neighboring permanent magnets at different end edges is the same. The said multiple excitation salient pole pairs are divided into two groups, and placed at both sides of the disc of the rotor support, and the two port faces of all excitation salient pole pairs are opposite. When the rotating shaft rotates, all the permanent magnets fixed at the edge of two ends of the cylinder will be able to pass from between the ports of all excitation salient pole pairs at both sides of the disc, and an air gap will be formed between the two magnetic pole faces of each permanent magnet and the port face of the excitation salient pole pair;

In the abovementioned first embodiment, the said rotor support consists of a disc and edge-folded cylinder, the inner wall of the central part of the edge-folded cylinder is fixedly connected with the outside edge of the disc, forming a "same-bottom dual-way bowl-rim inner-fold-edge" entity; the center of the disc is fixedly connected with the rotating shaft; the plane of the disc is vertical to the axial line of the rotating shaft; the plane of the disc is vertical to the axial line of the rotating shaft; the axial line of the edge-folded cylinder is superposed with the axial line of the rotating shaft, the edge-folded surface of cylinder with inner fold-edge is vertical to the axial line of the rotating shaft. Permanent magnets are divided into two groups and fixed at the fold-edges at both ends of edge-folded cylinder in a balanced and symmetric way, and the magnetic polarity of two neighboring permanent magnets on a same rotating surface are different. The said multiple excitation salient pole pairs are divided into two groups, and placed at two sides of the disc of the rotor support. The two port faces of all excitation salient pole pairs are opposite at the left and right side. When the rotating shaft rotates, all permanent magnets fixed at the fold-edges of both ends of cylinder with fold-edges could pass from between the port faces of all "C-shaped" excitation salient pole pairs at both sides of the disc, and an air gap will be formed between the two magnetic pole faces of permanent magnet and the port face of excitation salient pole pair.

In the abovementioned first embodiment, the number of excitation salient pole pairs on the said stator is N, the number of permanent magnets or "permanent magnet salient pole pairs" on the rotor is M, N and M meet the relational expression M=kN, and in which, M is an even number equal to or bigger than 2, N is a natural number equal to or bigger than 2, and when N is an odd number, k will be an even number; when N is an even number, k will be a natural number, and the ratio of M/N is not a positive integer.

In order to realize the second objective of this invention, in the abovementioned first embodiment, the said excitation salient pole pair consists of one "C-SHAPED" laminated iron core, one or two excitation coils, one or two permanent magnet assemblies or permanent magnets; the two salient pole port faces of the said "C-SHAPED" laminated iron core are opposite, and excitation coil is wound at the periphery of the "C-SHAPED" laminated iron core; the two magnetic pole faces of the said permanent magnet assembly closely cling to the laminated section of the laminated iron core; the said permanent magnet is embedded into the gap of the laminated iron core, the two magnetic pole faces of the permanent magnet cling closely to the laminated section of the gap of the laminated iron core; gap exists between the lateral side of permanent magnet and the laminated iron core; the winding direction of excitation coil makes that, when an excitation current is input into the excitation coil, the direction of excitation flux generated by this laminated iron core will be consistent with the direction of the permanent magnet flux of the attached permanent magnet assembly or permanent magnet; when sufficiently strong excitation current is input into the excitation coil, the excitation flux will force the closed permanent magnet flux to open, and make permanent magnet flux imported into the main loop of excitation flux, forming compound excitation magnetic potential on the port face of the laminated iron core;

The said rotor consists of a rotating shaft, rotor support and permanent magnet, and the center of the rotor support is fixed with the rotating shaft; multiple permanent magnets are fixed on the rotor support in a balanced way, and the magnetic polarity of neighboring permanent magnets are different. When the rotating shaft rotates, the magnet port faces of multiple permanent magnets on the rotor support will align with the port faces of each excitation salient pole pair on the stator one by one. During alignment, the compound excitation magnetic potentials on the port faces of excitation salient pole pair will form the shortest closed magnetic loop with permanent magnets through air gap.

In order to realize the second objective of this invention, in the abovementioned first embodiment, the said excitation salient pole pair consists of one "C-SHAPED" laminated iron core, one excitation coil and one permanent magnet assembly. The port faces of two salient poles of this "C-SHAPED" laminated iron core are opposite, the excitation coil is wound at the periphery of "C-SHAPED" laminated iron core, the magnetic pole S and magnetic pole N of permanent magnet assembly cross over the excitation coil respectively, and closely cling to the laminated section of "C-shaped" laminated iron core;

The said rotor consists of a rotating shaft, rotor support and multiple permanent magnets. The said rotor support consists of a disc and a cylinder; the edge of one end is fixedly connected with the outside edge of the disc, forming a "bowl-shaped" entity. The center of the disc is fixedly connected with the rotating shaft, the plane of the disc is vertical to the axial line of the rotating shaft, and the axial line of the cylinder is superposed with the axial line of the rotating shaft. Multiple permanent magnets are fixed at the end of another end of the cylinder in a balanced way, and the magnetic polarity of neighboring permanent magnets are different. When the rotating shaft rotates, all the permanent magnets fixed at the edge of one end of the cylinder will be able to pass from between the ports of stator excitation salient pole pair, and an air gap will be formed between the two magnetic pole faces of each permanent magnet and the port face of the excitation salient pole pair. If the permanent magnet is located between the two port faces of the excitation salient pole pair, a closed magnetic loop with air gap will be formed between the permanent magnet and the excitation salient pole pair;

Or, the said rotor consists of a rotating shaft, rotor support and multiple permanent magnets. The said rotor support consists of a disc and a cylinder. The inner wall of the middle part of the cylinder is fixedly connected with the outside edge of the disc, forming a "same-bottom, dual-direction, opening and bowl-shaped" entity. The center of the disc is fixedly connected with the rotating shaft, the plane of the disc is vertical to the axial line of the rotating shaft, and the axial line of the cylinder is superposed with the axial line of the rotating shaft. Multiple permanent magnets are fixed at the edges of two ends of the cylinder in a balanced way, and moreover, the magnetic polarity of neighboring permanent magnets at a same end edge are different, the magnetic polarity of neighboring permanent magnets at different end edges is the same. The said multiple excitation salient pole pairs are divided into two groups, and placed at both sides of the disc of the rotor support, and the two port faces of all excitation salient pole pairs are opposite. When the rotating shaft rotates, all the permanent magnets fixed at the edge of two ends of the cylinder will be able to pass from between the ports of all excitation salient pole pairs at both sides of the disc, and an air gap will be formed between the two magnetic pole faces of each permanent magnet and the port face of the excitation salient pole pair. When the permanent magnet is located between two port faces of the excitation salient pole air, a closed magnetic loop with air gap will be formed between the permanent magnet and the excitation salient pole pair;

Or, the said rotor consists of a rotating shaft, rotor support and multiple permanent magnets. The said rotor support consists of a disc and a cylinder. The inner wall of the middle part of the cylinder is fixedly connected with the outside edge of the disc, forming a "same-bottom, dual-direction, opening and bowl-shaped" entity. The center of the disc is fixedly connected with the rotating shaft, the plane of the disc is vertical to the axial line of the rotating shaft, and the axial line of the cylinder is superposed with the axial line of the rotating shaft. Multiple permanent magnets are fixed at the edges of two ends of the cylinder in a balanced way, and moreover, the magnetic polarity of neighboring permanent magnets at a same end edge are different, and a difference of central angle α exists between the permanent magnets at different ends. The said multiple excitation salient pole pairs are divided into two groups, and placed at both sides of the disc of the rotor support, and the two port faces of all excitation salient pole pairs are opposite. When the rotating shaft rotates, all the permanent magnets fixed at the edge of two ends of the cylinder will be able to pass from between the ports of all excitation salient pole pairs at both sides of the disc, and an air gap will be formed between the two magnetic pole faces of each permanent magnet and the port face of the excitation salient pole pair. When the permanent magnet is located between two port faces of the excitation salient pole air, a closed magnetic loop with air gap will be formed between the permanent magnet and the excitation salient pole pair;

Or, the said rotor support consists of a disc and edge-folded cylinder, the inner wall of the central part of the edge-folded cylinder is fixedly connected with the outside edge of the disc, forming a "same-bottom dual-way bowl-rim inner-fold-edge" entity; the center of the disc is fixedly connected with the rotating shaft; the plane of the disc is vertical to the axial line of the rotating shaft; the plane of the disc is vertical to the axial line of the rotating shaft; the axial line of the edge-folded cylinder is superposed with the axial line of the rotating shaft, the edge-folded surface of cylinder with inner fold-edge is vertical to the axial line of the rotating shaft. Permanent magnets are divided into two groups and fixed at the fold-edges at both ends of edge-folded cylinder in a balanced way, and the magnetic polarity of neighboring permanent magnets are different. The said multiple excitation salient pole pairs are divided into two groups, and placed at two sides of the disc of the rotor support. The two port faces of all excitation salient pole pairs are opposite at the left and right side. When the rotating shaft rotates, all permanent magnets fixed at the fold-edges of both ends of cylinder with fold-edges could pass from between the port faces of all "C-shaped" excitation salient pole pairs at both sides of the disc, and an air gap will be formed between the two magnetic pole faces of permanent magnet and the port face of excitation salient pole pair.

In order to realize the second objective of this invention, in the abovementioned first embodiment, the said excitation salient pole pair consists of one "C-SHAPED" laminated iron core, one group of excitation coil and two permanent magnets. There is a gap respectively on the upper and lower parallel frames of the said laminated iron core, two permanent magnets are respectively embedded into the gap of upper frame and the gap of lower frame. The port face of magnetic polarity N of the permanent magnet embedded into the gap of upper frame clings closely to the laminated iron core in clockwise direction, and the port face of its magnetic polarity S closely clings to the laminated iron core in counter-clockwise direction. Similarly, the port face of the magnetic polarity N of the permanent magnet embedded into the gap of the lower frame closely clings to the laminated iron core in clockwise direction, and the port face of its magnetic polarity S closely clings to the laminated iron core in counter-clockwise direction. Air gap exists between the lateral side of two permanent magnets and the laminated iron core, and the said excitation coil is wound on the vertical frame of the laminated iron core.

The said rotor consists of a rotating shaft, rotor support and multiple permanent magnets. The said rotor support consists of a disc and a cylinder; the edge of one end is fixedly connected with the outside edge of the disc, forming a "bowl-shaped" entity. The center of the disc is fixedly connected with the rotating shaft, the plane of the disc is vertical to the axial line of the rotating shaft, and the axial line of the cylinder is superposed with the axial line of the rotating shaft. Multiple permanent magnets are fixed at the end of another end of the cylinder in a balanced way, and the magnetic polarity of neighboring permanent magnets are different. When the rotating shaft rotates, all the permanent magnets fixed at the edge of one end of the cylinder will be able to pass from between the ports of stator excitation salient pole pair, and an air gap will be formed between the two magnet pole faces of each permanent magnet and the port face of the excitation salient pole pair. If the permanent magnet is located between the two port faces of the excitation salient pole pair, a closed magnetic loop with air gap will be formed between the permanent magnet and the excitation salient pole pair.

Or, the said rotor consists of a rotating shaft, rotor support and multiple permanent magnets. The said rotor support consists of a disc and a cylinder. The inner wall of the middle part of the cylinder is fixedly connected with the outside edge of the disc, forming a "same-bottom, dual-direction, opening and bowl-shaped" entity. The center of the disc is fixedly connected with the rotating shaft, the plane of the disc is vertical to the axial line of the rotating shaft, and the axial line of the cylinder is superposed with the axial line of the rotating shaft. Multiple permanent magnets are fixed at the edges of two ends of the cylinder in a balanced way, and moreover, the magnetic polarity of neighboring permanent magnets at a same end edge are different, the magnetic polarity of neighboring permanent magnets at different end edges is the same. The said multiple excitation salient pole pairs are divided into two groups, and placed at both sides of the disc of the rotor support, and the two port faces of all excitation salient pole pairs are opposite. When the rotating shaft rotates, all the permanent magnets fixed at the edge of two ends of the cylinder will be able to pass from between the ports of all excitation salient pole pairs at both sides of the disc, and an air gap will be formed between the two magnet pole faces of each permanent magnet and the port face of the excitation salient pole pair. When the permanent magnet is located between two port faces of the excitation salient pole air, a closed magnetic loop with air gap will be formed between the permanent magnet and the excitation salient pole pair.

In order to realize the second objective of this invention, in the abovementioned first embodiment, the said excitation salient pole pair consists of one "C-SHAPED" laminated iron core, two excitation coils and one permanent magnet. There is one gap on the vertical frame of the said laminated iron core, one permanent magnet is embedded into the gap on this frame. The port face of the magnet polarity N of the permanent magnet closely clings to the laminated iron core, and the port face of its magnetic polarity S closely clings to the laminated iron core. Air gap exists between the lateral side of the permanent magnet and the laminated iron core. Two excitation coils are wound at the periphery of the upper and lower frames of the "C-SHAPED" laminated iron core respectively;

The said rotor consists of a rotating shaft, rotor support and multiple permanent magnets. The said rotor support consists of a disc and a cylinder; the edge of one end of cylinder is fixedly connected with the outside edge of the disc, forming a "bowl-shaped" entity. The center of the disc is fixedly connected with the rotating shaft, the plane of the disc is vertical to the axial line of the rotating shaft, and the axial line of the cylinder is superposed with the axial line of the rotating shaft. Multiple permanent magnets are fixed at the end of another end of the cylinder in a balanced way, and the magnetic polarity of neighboring permanent magnets are different. When the rotating shaft rotates, all the permanent magnets fixed at the edge of one end of the cylinder will be able to pass from between the ports of stator excitation salient pole pair, and an air gap will be formed between the two magnetic pole faces of each permanent magnet and the port face of the excitation salient pole pair. If the permanent magnet is located between the two port faces of the excitation salient pole pair, a closed magnetic loop with air gap will be formed between the permanent magnet and the excitation salient pole pair;

Or, the said rotor consists of a rotating shaft, rotor support and multiple permanent magnets. The said rotor support consists of a disc and a cylinder. The inner wall of the middle part of the cylinder is fixedly connected with the outside edge of the disc, forming a "same-bottom, dual-direction, opening and bowl-shaped" entity. The center of the disc is fixedly connected with the rotating shaft, the plane of the disc is vertical to the axial line of the rotating shaft, and the axial line of the cylinder is superposed with the axial line of the rotating shaft. Multiple permanent magnets are fixed at the edges of two ends of the cylinder in a balanced way, and moreover, the magnetic polarity of neighboring permanent magnets at a same end edge are different, the magnetic polarity of neighboring permanent magnets at different end edges is the same. The said multiple excitation salient pole pairs are divided into two groups, and placed at both sides of the disc of the rotor support, and the two port faces of all excitation salient pole pairs are opposite. When the rotating shaft rotates, all the permanent magnets fixed at the edge of two ends of the cylinder will be able to pass from between the ports of all excitation salient pole pairs at both sides of the disc, and an air gap will be formed between the two magnetic pole faces of each permanent magnet and the port face of the excitation salient pole pair. When the permanent magnet is located between two port faces of the excitation salient pole air, a closed magnetic loop with air gap will be formed between the permanent magnet and the excitation salient pole pair;

In order to realize the abovementioned first objective of invention, the second embodiment of this invention is: the invention relates to an AC permanent magnet switched reluctance motor. It consists of a stator and rotor. The stator consists of multiple excitation salient pole pairs, which are fixed on the stator seat in a balanced way; each excitation salient pole pair consists of laminated iron core and excitation coil; all excitation salient pole pairs are mutually magnet-isolated, and each excitation salient pole pair is excited and controlled by an independent excitation coil. It is featured by that, the said excitation salient pole pair consists of "U-SHAPED" laminated iron core and excitation coil, and the port faces of this "U-SHAPED" laminated iron core are in the same direction. Said rotor consists of a rotating shaft, a rotor support and multiple permanent magnets; the center of the rotor support is fixed with the rotating shaft. The said rotor support is disc-shaped. Multiple permanent magnets are set up on one lateral side of magnetic disc by an inner ring and an outer ring and with the axial line of the rotating shaft as symmetry axis. The space between inner-ring permanent magnets is equal, so is the case between outer-ring permanent magnets. The disc is magnetic, so the inner-ring permanent magnets and outer-ring permanent magnets set up on a same radial line form a permanent magnet salient pole pair. The magnetic polarity of two neighboring permanent magnet salient pole pairs on a same rotating surface are different, and the distance between the two salient poles of every permanent magnet salient pole pair is the same as the distance between the two salient poles of the stator excitation salient pole pair. When the rotating shaft rotates, each permanent magnet salient pole pair on lateral sides of the disc will sweep over each excitation salient pole pair on the stator in turn, and an air gap will be formed between the two port faces of each permanent magnet salient pole pair and the two port faces of each excitation salient pole pair. When the two port faces of any permanent magnet salient pole pair on the rotor are just superposed with the two port faces of any excitation salient pole pair on the stator, a shortest magnetic loop will be formed between this permanent magnet salient pole pair and this excitation salient pole pair;

In the abovementioned second embodiment, the said rotor support is disc-shaped. Multiple permanent magnets are set up on two lateral sides of magnetic disc by an inner ring and an outer ring and with the axial line of the rotating shaft as symmetry axis. The space between inner-ring permanent magnets is equal, so is the case between outer-ring permanent magnets. The disc is magnetic, so the inner-ring permanent magnets and outer-ring permanent magnets set up on a same radial line form a permanent magnet salient pole pair. The magnetic polarity of two neighboring permanent magnet salient pole pairs on a same rotating surface are different, and the distance between the two salient poles of every permanent magnet salient pole pair is the same as the distance between the two salient poles of the stator excitation salient pole pair. The said multiple "U-shaped" excitation salient pole pairs are divided into two groups, and set up at both sides of the disc of the rotor support. When the rotating shaft rotates, each permanent magnet salient pole pair on lateral sides of the disc will sweep over each excitation salient pole pair on the stator in turn, and an air gap will be formed between the port faces of each permanent magnet salient pole pair and the port faces of each excitation salient pole pair. When the two port faces of any permanent magnet salient pole pair on the rotor are just superposed with the two port faces of any excitation salient pole pair on the stator, a shortest magnetic loop will be formed between this permanent magnet salient pole pair and this excitation salient pole pair;

In the abovementioned second embodiment, the number of excitation salient pole pairs on the said stator is N, the number of permanent magnets or "permanent magnet salient pole pairs" on the rotor is M, N and M meet the relational expression M=kN, and in which, M is an even number equal to or bigger than 2, N is a natural number equal to or bigger than 2, and when N is an odd number, k will be an even number; when N is an even number, k will be a natural number, and the ratio of M/N is not a positive integer.

In order to realize the second objective of this invention, in the abovementioned second embodiment, the said excitation salient pole pair consists of one "U-SHAPED" laminated iron core, one or two excitation coils, one or two permanent magnet assemblies or permanent magnets; the two salient pole port faces of the said "U-SHAPED" laminated iron core are opposite, and excitation coil is wound at the periphery of the "U-SHAPED" laminated iron core; the two magnetic pole faces of the said permanent magnet assembly closely cling to the laminated section of the laminated iron core; the said permanent magnet is embedded into the gap of the laminated iron core, the two magnetic pole faces of the permanent magnet cling closely to the laminated section of the gap of the laminated iron core; gap exists between the lateral side of permanent magnet and the laminated iron core; the winding direction of excitation coil makes that, when an excitation current is input into the excitation coil, the direction of excitation flux generated by this laminated iron core will be consistent with the direction of the permanent magnet flux of the attached permanent magnet assembly or permanent magnet; when sufficiently strong excitation current is input into the excitation coil, the excitation flux will force the closed permanent magnet flux to open, and make permanent magnet flux imported into the main loop of excitation flux, forming compound excitation magnetic potential on the port face of the laminated iron core;

The said rotor consists of a rotating shaft, rotor support and permanent magnet, and the center of the rotor support is fixed with the rotating shaft; multiple permanent magnets are fixed on the rotor support in a balanced way, and the magnetic polarity of neighboring permanent magnets are different, When the rotating shaft rotates, the magnet port faces of multiple permanent magnets on the rotor support will align with the port faces of each excitation salient pole pair on the stator one by one. During alignment, the compound excitation magnetic potentials on the port faces of excitation salient pole pair will form the shortest closed magnetic loop with permanent magnets through air gap.

In order to realize the second objective of this invention, In the abovementioned second embodiment, the said excitation salient pole pair consists of one "U-SHAPED" laminated iron core, one excitation coil and one permanent magnet. The two salient pole port faces of this "U-SHAPED" laminated iron core are in the same direction. Excitation coil is wound at the periphery of the frame of the "U-SHAPED" laminated iron core. The magnetic pole S and magnetic pole N of permanent magnet assemblies cross over excitation coil according to setting respectively, and the magnetic pole S and magnetic pole N of permanent magnet assemblies closely cling to the laminated section of the "U-SHAPED" laminated iron core;

The said rotor support is disc-shaped. Multiple permanent magnets are set up on one lateral side of magnetic disc by an inner ring and an outer ring and with the axial line of the rotating shaft as symmetry axis. The space between inner-ring permanent magnets is equal, so is the case between outer-ring permanent magnets. The disc is magnetic, so the inner-ring permanent magnets and outer-ring permanent magnets set up on a same radial line form a permanent magnet salient pole pair. The magnetic polarity of two neighboring permanent magnet salient pole pairs are different, and the distance between the two salient poles of every permanent magnet salient pole pair is the same as the distance between the two salient poles of the stator excitation salient pole pair. When the rotating shaft rotates, each permanent magnet salient pole pair on the lateral side of the disc will sweep over each excitation salient pole pair on the stator in turn, and an air gap will be formed between the end face of each permanent magnet salient pole pair and the port face of each excitation salient pole pair. When the magnetic port faces of the permanent magnet salient pole pair and excitation salient pole pair are superposed, a closed magnetic loop with air gap will be formed between the permanent magnet salient pole pair and the excitation salient pole pair;

Or, the said rotor support is disc-shaped. Multiple permanent magnets are set up on two lateral sides of magnetic disc by an inner ring and an outer ring and with the axial line of the rotating shaft as symmetry axis. The space between inner-ring permanent magnets is equal, so is the case between outer-ring permanent magnets. The disc is magnetic, so the inner-ring permanent magnets and outer-ring permanent magnets set up on a same radial line form a permanent magnet salient pole pair. The magnetic polarity of two neighboring permanent magnet salient pole pairs are different, and the distance between the two salient poles of every permanent magnet salient pole pair is the same as the distance between the two salient poles of the stator excitation salient pole pair. When the rotating shaft rotates, each permanent magnet salient pole pair on the two lateral sides of the disc will sweep over each excitation salient pole pair on the stator in turn, and an air gap will be formed between the end face of each permanent magnet salient pole pair and the port face of each excitation salient pole pair.

In order to realize the second objective of this invention, in the abovementioned second embodiment, the said excitation salient pole pair consists of one "U-SHAPED" laminated iron core, two groups of excitation coil and two permanent magnet assemblies. The two salient pole port faces of this "U-SHAPED" laminated iron core are in the same direction, the excitation coil is wound at the periphery of two parallel frames of the "U-SHAPED" laminated iron core, the magnetic pole S and magnetic pole N of two permanent magnet assemblies cross over the excitation coil respectively according to setting, and the magnetic pole S and magnetic pole N of two permanent magnet assemblies closely cling to the laminated section of the "U-SHAPED" laminated iron core;

The said rotor support is disc-shaped. Multiple permanent magnets are set up on one lateral side of magnetic disc by an inner ring and an outer ring and with the axial line of the rotating shaft as symmetry axis. The space between inner-ring permanent magnets is equal, so is the case between outer-ring permanent magnets. The disc is magnetic, so the inner-ring permanent magnets and outer-ring permanent magnets set up on a same radial line form a permanent magnet salient pole pair. The magnetic polarity of two neighboring permanent magnet salient pole pairs are different, and the distance between the two salient poles of every permanent magnet salient pole pair is the same as the distance between the two salient poles of the stator excitation salient pole pair. When the rotating shaft rotates, each permanent magnet salient pole pair on the lateral side of the disc will sweep over each excitation salient pole pair on the stator in turn, and an air gap will be formed between the end face of each permanent magnet salient pole pair and the port face of each excitation salient pole pair. When the magnetic port faces of the permanent magnet salient pole pair and excitation salient pole pair are superposed, a closed magnetic loop with air gap will be formed between the permanent magnet salient pole pair and the excitation salient pole pair;

Or, the said rotor support is disc-shaped. Multiple permanent magnets are set up on two lateral sides of magnetic disc by an inner ring and an outer ring and with the axial line of the rotating shaft as symmetry axis. The space between inner-ring permanent magnets is equal, so is the case between outer-ring permanent magnets. The disc is magnetic, so the inner-ring permanent magnets and outer-ring permanent magnets set up on a same radial line form a permanent magnet salient pole pair. The magnetic polarity of two neighboring permanent magnet salient pole pairs are different, and the distance between the two salient poles of every permanent magnet salient pole pair is the same as the distance between the two salient poles of the stator excitation salient pole pair. When the rotating shaft rotates, each permanent magnet salient pole pair on two lateral sides of the disc will sweep over each excitation salient pole pair on the stator in turn, and an air gap will be formed between the end face of each permanent magnet salient pole pair and the port face of each excitation salient pole pair. When the magnetic port faces of the permanent magnet salient pole pair and excitation salient pole pair are superposed, a closed magnetic loop with air gap will be formed between the permanent magnet salient pole pair and the excitation salient pole pair;

In order to realize the third objective of this invention, it provides a method for excitation control of an AC permanent magnet switched reluctance motor. The stator of this AC permanent magnet switched reluctance motor consists of a stator seat and multiple compound excitation salient pole pair units, which are fixed on the stator seat in a balanced way, mutually magnet-isolated, and are excited and controlled by independent excitation coil each. The said compound excitation salient pole pair consists of one "C-SHAPED" or "U-SHAPED" laminated iron core, one or two excitation coils, one or two permanent magnet assemblies or permanent magnets; the two salient pole port faces of the said "C-SHAPED" laminated iron core are opposite, the two salient pole port faces of the said "U-SHAPED" laminated iron core are in the same direction. The excitation coil is wound at the periphery of the "C-SHAPED" or "U-SHAPED" laminated iron core, the two poles of the said permanent magnet assemblies closely cling to the laminated section of the laminated iron core according to setting; the said permanent magnet is embedded into the gap of the laminated iron core; the two poles of permanent magnets closely cling to the laminated section of the laminated iron core according to setting; gap exists between the lateral side of permanent magnets and the laminated iron core. The winding direction of excitation coil makes that, when current is input into this magnetic coil, the direction of excitation flux generated by this laminated iron core is consistent with the direction of the permanent magnet flux of the attached permanent magnet assemblies or the permanent magnets. When sufficiently strong excitation current is input into the excitation coil, the excitation flux will face the closed permanent magnet flux to open, make the permanent magnet flux imported into the main loop of excitation flux, and form compound excitation magnetic potential at the port surface of laminated iron core; the said rotor consists of a rotating shaft, rotor support and permanent magnet, and the center of the rotor support is fixed with the rotating shaft; multiple permanent magnets are fixed on the rotor support in a balanced way, and the magnetic polarity of neighboring permanent magnets are different. When the rotating shaft rotates, the magnet port faces of multiple permanent magnets on the rotor support will align with the port faces of multiple excitation salient pole pairs on the stator one by one. During alignment, the compound excitation magnetic potentials on the port faces of excitation salient pole pair will form the shortest closed magnetic loop with permanent magnets through air gap. It's featured by that, the said excitation control method is to excite the excitation coil of compound excitation salient pole pair on the stator with square-wave or approximate square-wave one-way pulse current or positive and negative alternating pulse current, and to ensure that the density of excitation flux generated by each pulse current in magnetic loop is not lower than the density of magnetic flux formed by permanent magnet assemblies in the same circuit. In this way. The excitation flux generated by the excitation current of excitation coil will force the original static permanent magnet flux in the excitation iron core set up in parallel connection to change the closing direction and to compound with electric excitation magnetic flux in a laminated way, thus to form the compound excitation magnetic potential with different magnetic polarities at the two salient pole port faces of the compound excitation salient pole pair. This compound excitation magnetic potential could pass through the air gap, and form a new closed magnetic loop through the permanent magnets or permanent salient pole pairs on the rotor support. Such new closed magnetic loop is just the shortest magnetic circuit needed by reluctance motor stator for obtaining rotating torque. When the motor stator rotates, and the radial center line of any permanent magnet or any permanent magnet salient pole pair on the rotor support is superposed and aligns with the radial center line of any compound excitation salient pole pair on the stator, the current in original direction of current in the excitation coil of this compound excitation salient pole pair will be closed to zero. At this moment, by changing or controlling the angle of current re-direction and breakover within the scope of the included angle between the radial center line of the superposed salient pole pair and the radial center line of neighboring stator excitation winding salient pole pair (namely changing the angular coordinates of re-direction opening between the center of rotor salient pole and the center line of the next excitation salient pole pair in rotation direction, or changing the beforehand and afterwards time of re-direction opening within the scope of included angle between the center line of superposition and the radial center line of excitation salient pole pair of neighboring winding), we may control the torque within the air gap between the rotor and stator of motor, in order to achieve the effects of controlling the rotation speed of motor and the making the best of permanent-magnet synergistic energy conservation The advantages of this invention are as follows:

1. This invention dexterously optimizes the design of the stator with "independent excitation salient pole pair" and the rotor with cantilever support structure, maintains the characteristics of the "independent excitation salient pole pair", namely each group of excitation coil independently excites one "excitation salient pole pair", each "excitation salient pole pair" is mutually independent, magnetic-isolation, and interference-free, and each group of excitation coil could execute re-direction control independently. The concept of re-direction of electric excitation currents means that the positive current reverses into a negative current, and vice versa. In this way, each "excitation salient pole pair" on the stator and the permanent magnet on the rotor could form ring-shaped closed magnetic circuit, thus greatly reducing magnetic circuit, lowering the interference and magnetic leakage of the common magnetic circuit, and improving the power intensity and equipment utilization rate.

2. This invention adopts the unique cantilever support structure for the rotor. Cooperating with the "independent excitation salient pole pair" of the stator, this rotor support structure, on the one hand, increases the stress points of the rotor and the arm of force of the rotating shaft, so that the rotating shaft obtains greater rotating torque; on the other hand, it improves the dynamic balance performance of the rotor, especially that the rotor adopts a dual-cantilever support structure.

3. This invention takes the lead in bringing forward the concept of "permanent-magnet synergistic" reluctance motor, dexterously designs the integrated structure of "permanent magnet" and "excitation salient pole pair" of the stator, forms the compound excitation salient pole pair, makes it available for the intrinsic magnetic flux of the permanent magnet to flow into the excitation flux loop under the circumstance that the "compound excitation salient pole pair" is subject to the electric excitation of the excitation coil, so as to obtain the superimposed magnetic flux of the electric excitation flux and permanent magnet flux by means of excitation current. This superimposed magnetic flux could greatly enhance the magnetic induction in the air gap of the motor, and increase the torque. Making motor have a very high torque at a low rotating speed is an important index of motors for vehicles (electric mopeds, and electric automobiles, etc.), and it could raise vehicles' reaction speed and controllability, save electric energy, and enhance the endurance ability of vehicles.

4. This invention makes the best of the characteristic that the "compound excitation salient pole pairs" on the stator are mutually magnetic-isolation and interference-free, and independent excitation coils execute re-direction control separately. This greatly reduces magnetic circuit, lowers the interference and magnetic leakage of common magnetic circuit, and raises power density and equipment utilization ratio.

5. This invention initiates the control method of scanning and converting the windings of "excitation salient pole pair" one by one: during the rotation of the rotor, the permanent magnet fixed on the rotor support will scan the salient poles of each independent "excitation salient pole pair" on the stator one by one, control the random conversion of the windings of "independent excitation salient pole pair" unit according to the set parameters, convert the magnetic polarity of the original salient pole, so that every permanent magnet on rotor support is always under the dual magnetic forces, namely "sucking at the front and pushing at the rear", of the salient poles of "excitation salient pole pair" of the neighboring stator, so as to greatly enhance the torque, and meanwhile, to obtain extremely high torque stability.

6. This invention initiates the re-direction method of independent magnetic flux linkage reversal of "independent excitation salient pole pair": it executes current re-direction of windings when the magnetic circuit of re-direction winding is in high reluctance state, and the inductance of windings is very small, so that the time factor of motors is very small. It greatly speeds up re-direction, and provides a new method for improving the rotating speed and power of motors.

7. This invention adopts the international latest and cutting-edge soft magnetic material, namely nanocrystalline strip, for the laminated iron core in the compound excitation salient pole pair, applies the new material of high magnetoconductivity, high efficiency, low consumption and energy conservation to the laminated iron core of motors in virtue of unique seamless structure design and processing technique, greatly raises the efficiency of motors, and thus initiates the seamless application of nanocrystalline material to laminated iron core of motors.

8. This invention adopts the unique hollow building block type and modularized structure design. It decomposes the integrated structure and magnetic circuit of traditional motors into building block type and modularized unit components; and through the combination of primary forming which is taken as the main processing means and the production process of automatic streamlined production, it greatly raises labor productivity, lowers production cost, and saves raw materials.

9. This invention uniquely creates the cooling method of internal recycling through the structure design of the rotor support and the air stator, obviously enhances the cooling efficiency of motors, and solves the long-term difficult problem of demagnetization of permanent magnet after being heated.

DESCRIPTION OF ATTACHED FIGURES

FIG. 19 shows the schematic diagram of the structure appearance of dual-sided cantilever edge-folded rotor support and the permanent magnet in this invention.

FIG. 20 shows the schematic diagram of the structure appearance of dual-cantilever edge-folded rotor support motor in the fourth embodiment of this invention.

FIG. 21 shows the schematic diagram of the structure of dual-cantilever edge-folded rotor support motor in the fourth embodiment of this invention.

FIG. 22 shows the sectional view of the structure of dual-cantilever edge-folded rotor support motor in the fourth embodiment of this invention (the sectional view in F-F direction of FIG. 21).

FIG. 23 shows the schematic diagram of the structure of "U-SHAPED" monocoil excitation salient pole pair (the port faces of magnetic poles are in the same direction) in this invention.

FIG. 24 shows the schematic diagram of the structure appearance of the "U-SHAPED" monocoil excitation salient pole pair in this invention.

FIG. 73 shows the schematic diagram of the structure of the disc-shaped rotor support and the permanent magnet in the fifteenth embodiment of this invention.

FIG. 74 shows the sectional view of the structure of the disc-shaped rotor support and the permanent magnet in the fifteenth embodiment of this invention (the sectional view in G-G direction of FIG. 73).

FIG. 75 shows the schematic diagram of the appearance structure of the disc-shaped rotor support and the permanent magnet in the fifteenth embodiment of this invention.

FIG. 76 shows the schematic diagram of the structure appearance of the unipolar permanent-magnet synergistic reluctance motor with permanent magnet set up on single lateral side of the disc-shaped rotor support in the fifteenth embodiment of this invention.

Figure 91:
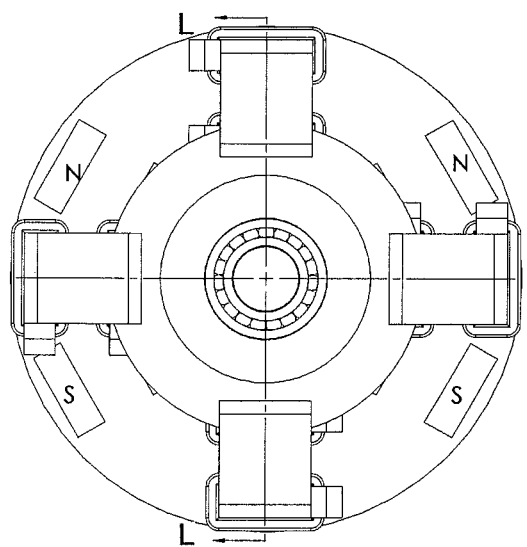
Figure 92:
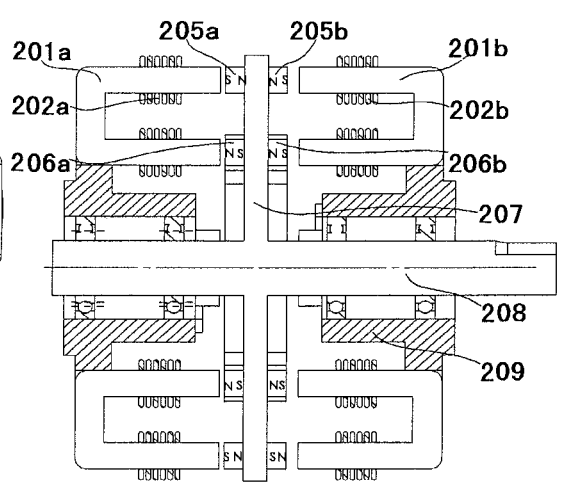

FIG. 91 shows the schematic diagram of the structure of the bipolar permanent-magnet synergistic reluctance motor with permanent magnets set up on both lateral sides of the disc-shaped rotor support in the nineteenth embodiment of this invention FIG. 92 shows the sectional view of the structure of the bipolar permanent-magnet synergistic reluctance motor with permanent magnets set up on both lateral sides of the disc-shaped rotor support in the nineteenth embodiment of this invention (the sectional view in L-L direction of FIG. 91).

In the above attached figures,
11 indicates a "C-SHAPED" laminated iron core,
12 indicates an excitation coil,
13 indicates a permanent magnet,
14 indicates a cylinder,
15 indicates a disc,
16 indicates a rotating shaft,
17 indicates a stator seat,
18 indicates a bearing,
21*a* indicates a "C-SHAPED" laminated iron core,
21*b* indicates a "C-SHAPED" laminated iron core,
22*a* indicates an excitation coil,
22*b* indicates an excitation coil,
23*a* indicates a permanent magnet,
23*b* indicates a permanent magnet,
24 indicates a cylinder,
25 indicates a disc,
26 indicates a rotating shaft,
27 indicates a stator seat,
28 indicates a bearing,
33*a* indicates a permanent magnet,
33*b* indicates a permanent magnet,
34 indicates a cylinder,
35 indicates a disc,
36 indicates a rotating shaft,
41*a* indicates a "C-SHAPED" laminated iron core,
41*b* indicates a "C-SHAPED" laminated iron core,
42*a* indicates an excitation coil,
42*b* indicates an excitation coil,
43*a* indicates a permanent magnet,
43*b* indicates a permanent magnet,
44 indicates an edge-folded cylinder,
45 indicates a disc,
46 indicates a rotating shaft,
47 indicates a stator seat,
48 indicates a bearing,
51 indicates a "U-SHAPED" laminated iron core,
52 indicates an excitation coil,
53 indicates a permanent magnet,
54 indicates a permanent magnet,
55 indicates a disc,
56 indicates a rotating shaft,
57 indicates a stator seat,
58 indicates a bearing,
61*a* indicates a "U-SHAPED" laminated iron core,
61*b* indicates a "U-SHAPED" laminated iron core,
62*a* indicates an excitation coil,
62*b* indicates an excitation coil,
63*a* indicates a permanent magnet,
63*b* indicates a permanent magnet,
64*a* indicates a permanent magnet,
64*b* indicates a permanent magnet,
65 indicates a disc,
66 indicates a rotating shaft,
67 indicates a stator seat,
68 indicates a bearing,
71 indicates a "U-SHAPED" laminated iron core,
72 indicates an excitation coil,
73 indicates a permanent magnet,
74 indicates a permanent magnet,
75 indicates a disc,
76 indicates a rotating shaft,
77 indicates a stator seat,
78 indicates a bearing.
In the above attached figures,
111 indicates a "C-SHAPED" laminated iron core,
112 indicates an excitation coil,
113 indicates a permanent magnet, 114 indicates a cylinder,
115 indicates a disc,
116 indicates a rotating shaft,
117 indicates a stator seat,
118 indicates a bearing,
119 indicates a permanent magnet,
120 indicates a magnetizer,
123a indicates a permanent magnet,
123b indicates a permanent magnet,
124 indicates a cylinder,
125 indicates a disc,
126 indicates a rotating shaft,
127 indicates a stator seat,
128 indicates a bearing,
129a indicates a permanent magnet,
129b indicates a permanent magnet,
130a indicates a magnetizer,
130b indicates a magnetizer,
133a indicates a permanent magnet,
133b indicates a permanent magnet,
134 indicates a cylinder,
135 indicates a disc,
136 indicates a rotating shaft,
141 indicates a "C-SHAPED" laminated iron core,
142 indicates an excitation coil,
143 indicates a magnetizer,
144 indicates a permanent magnet,
145 indicates a permanent magnet,
146 indicates a cylinder,
147 indicates a disc,
148 indicates a rotating shaft,
149 indicates an excitation coil,
150 indicates a stator seat,
151 indicates a "C-SHAPED" laminated iron core,
152 indicates an excitation coil,
153 indicates a permanent magnet,
154 indicates the gap between permanent magnet and laminated iron core,
155 indicates a permanent magnet,
156 indicates a cylinder,
157 indicates a disc,
158 indicates a rotating shaft,
159 indicates a bearing,
160 indicates a stator seat,
161 indicates a "C-SHAPED" laminated iron core,
162 indicates an excitation coil,
163 indicates a permanent magnet,
164 indicates the gap between permanent magnet and laminated iron core,
165 indicates an excitation coil,
171 indicates a "U-SHAPED" laminated iron core,
172 indicates an excitation coil,
173 indicates a permanent magnet,
174 indicates a magnetizer,
175 indicates a permanent magnet,
176 indicates a permanent magnet,
177 indicates a disc,
178 indicates a rotating shaft,
179 indicates a bearing,
180 indicates a stator seat,
181a indicates a "U-SHAPED" laminated iron core,
181b indicates a "U-SHAPED" laminated iron core,
182a indicates an excitation coil,
182b indicates an excitation coil,
185a indicates a permanent magnet,
185b indicates a permanent magnet,
186a indicates a permanent magnet,
186b indicates a permanent magnet,
187 indicates a stator seat,
188 indicates a rotating shaft,
191 indicates a "U-SHAPED" laminated iron core,
192 indicates an excitation coil,
193 indicates a permanent magnet,
194 indicates a magnetizer,
195 indicates a permanent magnet,
196 indicates a permanent magnet,
197 indicates a disc,
198 indicates a rotating shaft,
199 indicates a stator seat,
201a indicates a "U-SHAPED" laminated iron core,
201b indicates a "U-SHAPED laminated iron core,
202a indicates an excitation coil,
202b indicates an excitation coil,
205a indicates a permanent magnet,
205b indicates a permanent magnet,
206a indicates a permanent magnet,
206b indicates a permanent magnet,
207 indicates a disc,
208 indicates a rotating shaft,
209 indicates a stator seat.

Concrete Implementation Methods

Embodiment 1

Figure 6:
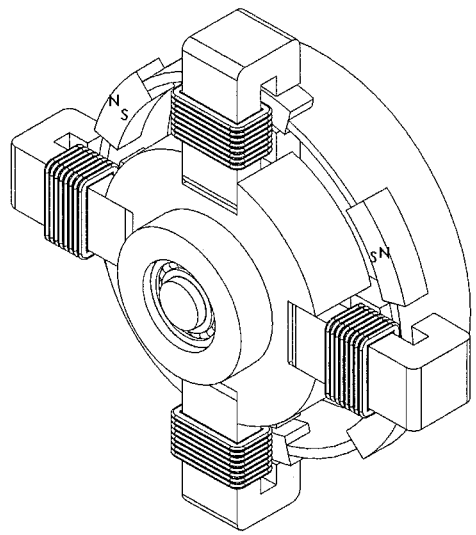
FIG. 6 shows the schematic diagram of the structure of single-cantilever rotor support motor in the first embodiment of this invention.
Figure 7:
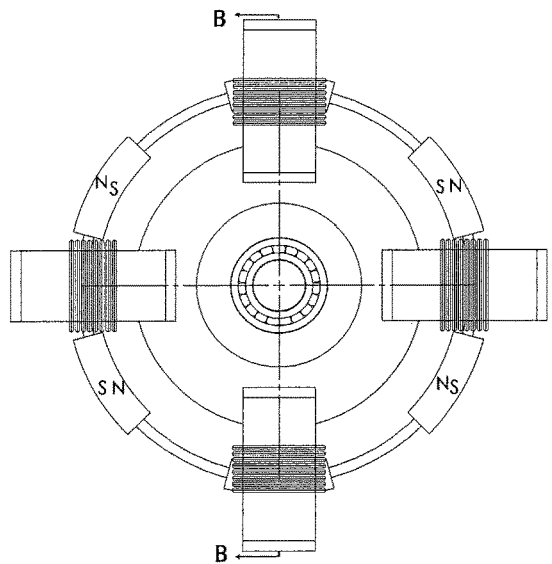
FIG. 7 shows the schematic diagram of the structure of single-cantilever rotor support motor in the first embodiment of this invention.
Figure 8:
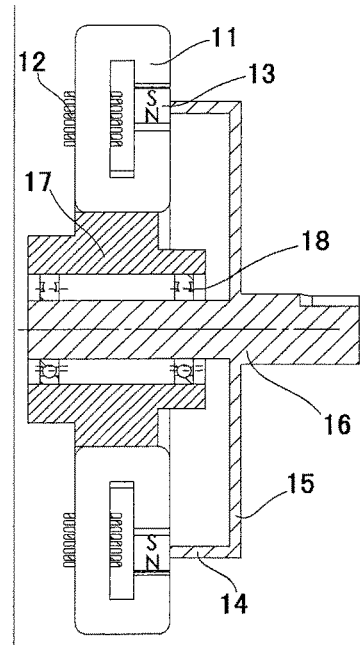
FIG. 8 shows the sectional view of the structure of single-cantilever rotor support motor in the first embodiment of this invention (the sectional view in B-B direction of FIG. 7).
Figure 9:
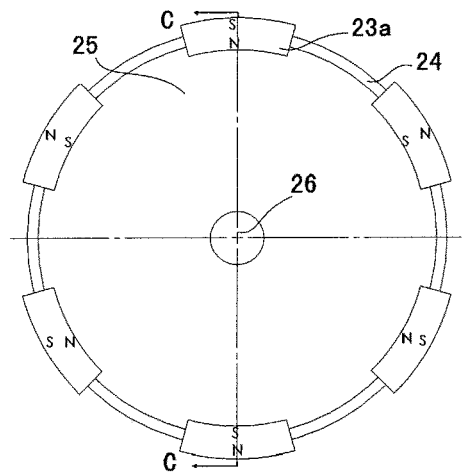
FIG. 9 shows the schematic diagram of the schematic diagram of the structures of dual-sided cantilever rotor support and the permanent magnet in this invention.
Figure 10:
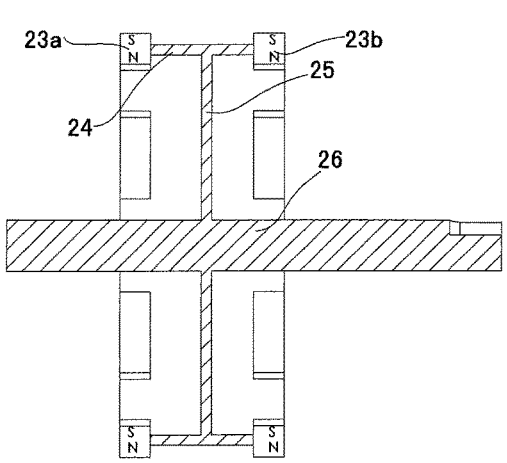
FIG. 10 shows the schematic diagram of the sectional view of the structure of dual-sided cantilever rotor support and the permanent magnet (the sectional view in C-C direction of FIG. 9) in this invention.

This embodiment provides an AC Permanent-Magnet Switched Reluctance Motor, which has a "C-SHAPED" monocoil excitation salient pole pair set up on a stator, and has a rotor consisting of single-sided cantilever support. Its structure and appearance are as shown in FIGS. 6-8.

Figure 1:
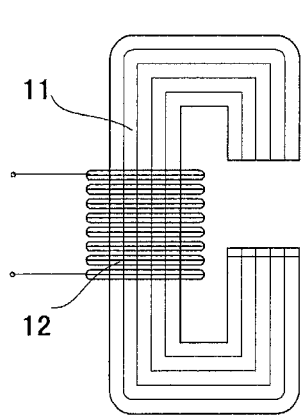
FIG. 1 shows the schematic diagram of the structure of "C-SHAPED" monocoil excitation salient pole pair in accordance with the invention (the upper and lower port faces of magnetic poles are opposite).
Figure 2:
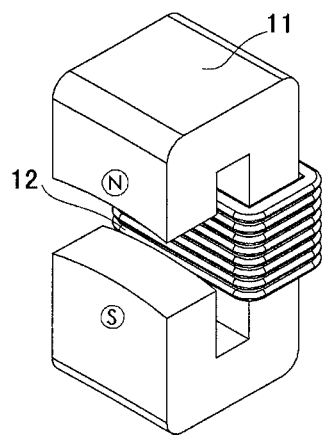
FIG. 2 shows the schematic diagram of the structure appearance of "C-SHAPED" monocoil excitation salient pole pair in accordance with the invention.

In this embodiment, the stator consists of a stator seat 17 and four "C-SHAPED" excitation salient pole pairs, which are set up respectively at the upside, downside, left side and right side, and with a distance of 90-degree central angle among each other. The "C-SHAPED" excitation salient pole pair consists of a "C-SHAPED" laminated iron core 11 and an excitation coil 12, and the excitation coil 12 is wound around the periphery of the central part of the laminated iron core 11, as shown in FIG. 1. The two port faces of "C-SHAPED" laminated iron core are opposite, and the two port faces are of curved surfaces. When the excitation coil is input a positive excitation current, the magnetic polarity N will be presented immediately at the upper port face of the "C-shaped" excitation salient pole pair, and meanwhile, the magnetic pole S will be presented immediately at the lower port face of the "C-shaped" excitation salient pole pair, as shown in FIG. 2. When the excitation coil inputs a negative excitation current, the magnetic polarity S will be presented immediately at the upper port face of the "C-shaped" excitation salient pole pair, and meanwhile, the magnetic pole N will be presented immediately at the lower port face of the "C-shaped" excitation salient pole pair.

Figure 3:
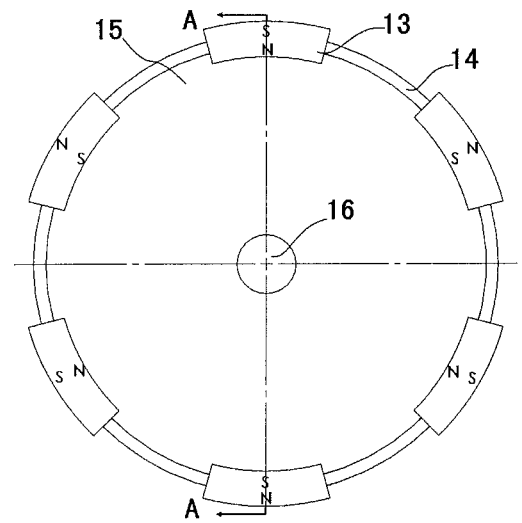
FIG. 3 shows the schematic diagram of the structures of single-sided cantilever rotor support and the permanent magnet in accordance with the invention.
Figure 4:
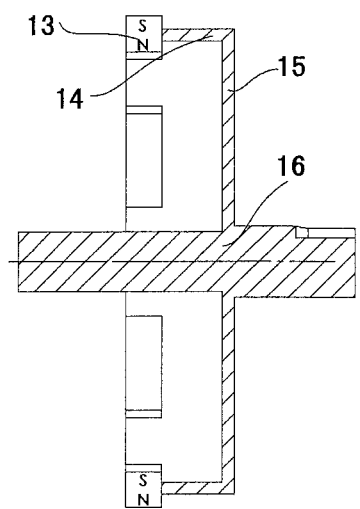
FIG. 4 shows the sectional view of the structures of single-sided cantilever rotor support and the permanent magnet in accordance with the invention (the sectional view in A-A direction of FIG. 3).
Figure 5:
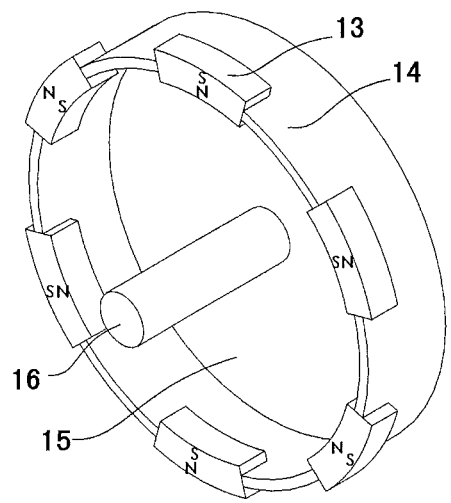
FIG. 5 shows the schematic diagram of the structure appearance of single-sided cantilever rotor support and the permanent magnet in this invention.

In this embodiment, the rotor consists of a rotating shaft 16 and a single-sided cantilever rotor support. The single-sided cantilever rotor support consists of a disc 15 and a cylinder 14; the disc 15 is fixed with the rotating shaft 16. The plane of the disc 15 is vertical to the axial line of the rotating shaft 16. The axial line of the cylinder 14 is superposed with that of the rotating shaft. The edge of one end of cylinder 14 is fixedly connected with the disc 15, forming a rotor support of single-sided cantilever structure; the edge of the other end of the cylinder 14 is fixed with six permanent magnets 13 at equal interval, while the setting of magnetic polarity of permanent magnet 13 is as shown in FIG. 3, there is a distance of 60-degree central angle among every permanent magnet, moreover, the magnetic polarity of two neighboring permanent magnets on a same rotating surface are different, and the radian of two magnet pole faces of each permanent magnet is consistent with that of the two port faces of the "C-Shaped" excitation salient pole pair. When the rotating shaft 16 rotates, the same air gap will exist between the two magnetic pole port faces of each permanent magnet and the upper and lower port faces of laminated core 11 of the "C-shaped" excitation salient pole pair.

The action mechanism and driving control method of this embodiment: When a positive excitation current is input into the excitation coil 12 of the "C-shaped" excitation salient pole pair above the stator, the upper port face of this "C-shaped" excitation salient pole pair presents the N-pole magnetic property, and the lower port faces presents S-pole magnetic property. This "C-shaped" excitation salient pole pair will produce magnetic attractive force on the permanent magnet 13 in which the magnetic property of external section is S and magnetic polarity of internal section is N on the rotor cantilever, and meanwhile, this "C-shaped" excitation salient pole pair will produce magnetic thrust on the permanent magnet with magnetic polarity N of external section and magnetic polarity S of internal section on rotor cantilever. Under the action mechanism of "attracting rear permanent magnet, and repelling front permanent magnet at the same time". This "C-shaped" excitation salient pole pair forms rotating toque towards the rotor. When the attracted permanent magnet is located between the upper and lower port faces of this "C-shaped" excitation salient pole pair, as shown in FIG. 8, the exciting magnetic potential of the "C-SHAPED" excitation salient pole pair forms a closed magnetic loop with relatively small reluctance through the air gap of curved surface above the permanent magnet. The permanent magnet 13, and the air gap on curved surface below the permanent magnet. When the upper and lower port faces of the permanent magnet 13 and the "C-shaped" excitation salient pole pair are in alignment, the motor driving control device will change the direction of excitation current of the excitation coil of this "C-shaped" excitation salient pole pair, and will input a negative excitation current to change the magnetic polarity of the upper and lower port faces of this "C-shaped" excitation salient pole pair, namely the upper port face presents S-pole magnetic property, and the lower port face presents the N-pole magnetic property, and here, this "C-shaped" excitation salient pole pair will repeat the action process of "sucking the rear and pushing the front". In this embodiment, there are four "C-shaped" excitation salient pole pairs on the stator seat, and six permanent magnets on the rotor cantilever support. Every time when the rotating shaft rotates by 30-degree central angle, two "C-shaped" excitation salient pole pairs will be in alignment with two permanent magnets, namely permanent magnets are located between the upper and lower port faces of "C-shaped" excitation salient pole pairs, thus realizing the continuous torque output of the rotor.

In this embodiment, the single-sided cantilever structure is adopted for the rotor support of the motor, and this greatly compresses the axial size of traditional switched reluctance motor. In addition, the special driving control method in this embodiment effectively eliminates the negative torque difficult to overcome by traditional switched reluctance motor, and so further enhances the efficacy of the motor.

Embodiment 2

Figure 12:
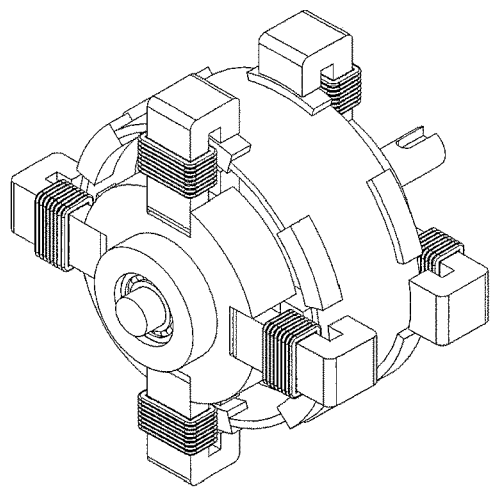
FIG. 12 shows the schematic diagram of the structure appearance of dual-cantilever rotor support in the second embodiment of this invention.
Figure 13:
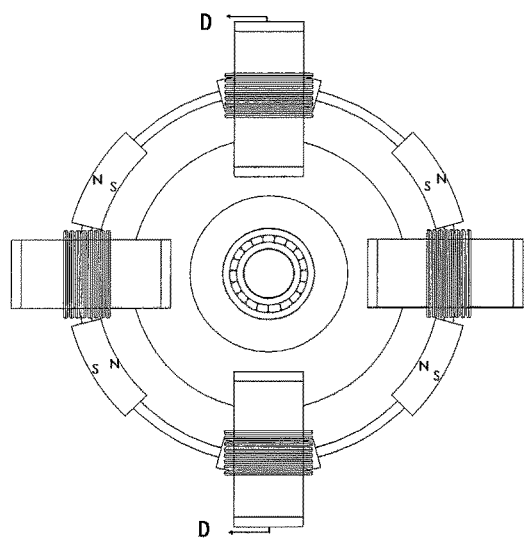
FIG. 13 shows the schematic diagram of the structure of dual-cantilever rotor support motor in the second embodiment of this invention.
Figure 14:
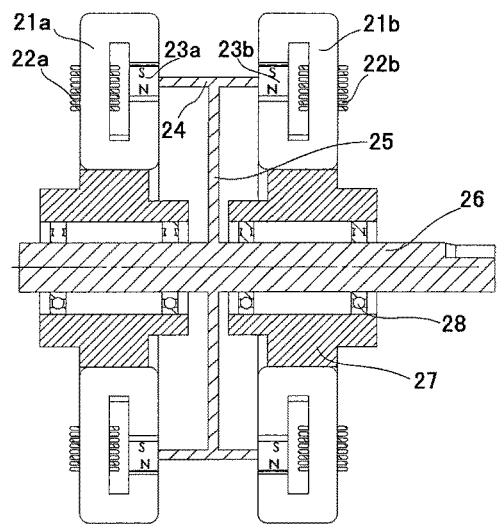
FIG. 14 shows the sectional view of the structure of dual-cantilever rotor support motor in the second embodiment of this invention (the sectional view in D-D direction of FIG. 13).

This embodiment provides an AC Permanent-Magnet Switched Reluctance Motor, which has "C-SHAPED" monocoil excitation salient pole pair set up on the stator, and has a rotor consisting of a dual-sided cantilever support. Its appearance and structure are as shown in FIGS. 12-14.

Figure 11:
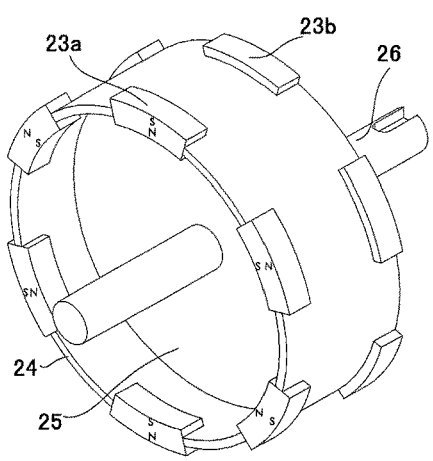
FIG. 11 shows the schematic diagram of the schematic diagram of the structure appearance of dual-sided cantilever rotor support and the permanent magnet in this invention.

In this embodiment, the rotor consists of a rotating shaft 26 and a dual-sided cantilever rotor support. The dual-sided cantilever rotor support consists of a disc 25 and a cylinder 24, the center of the disc 25 is fixed with the rotating shaft. The plane of the disc 25 is vertical to the axial line of the rotating shaft 26. The axial line of the cylinder 25 is superposed with that of the rotating shaft 26, the cylinder 24 is fixedly connected at its ½ position with the disc 25, forming rotor support of dual-sided cantilever structure. Six permanent magnets are fixed with equal interval at the edges of both ends of the cylinder 24, and the permanent magnets at both ends of the cylinder 24 take the disc 25 as a symmetric surface, that's to say, the permanent magnet 23a at the edge of the left end of the cylinder 24 and the permanent magnet 23b at the edge of the right end of the cylinder 24 take the disc 25 as the symmetric surface, and the magnetic polarity setting of the permanent magnets is as shown in FIG. 11. The central angle between the radial central lines of every permanent magnet differs by 60 degrees, the magnetic polarity of two neighboring permanent magnets are different, and the radian of two magnet pole faces of each permanent magnet is consistent with the radian of the two port faces of "C-shaped" excitation salient pole pair. When the rotating shaft rotates, an air gap of the same interval will exist between the two magnet pole faces of each permanent magnet and the two port faces of each "C-shaped" excitation salient pole pair.

In this embodiment, the structural characteristics of the "C-shaped" excitation salient pole pair on the stator are the same as those in the first embodiment. The differences rest with that, in this embodiment, there are eight "C-shaped" excitation salient pole pairs on the stator, with four forming one group, and set up symmetrically with the rotor disc 24 as the symmetric surface, as shown in FIG. 13 and FIG. 14. The mechanism for the mutual action of the "C-shaped" excitation salient pole pairs at both sides of the rotor support and the permanent magnet on the rotor is completely the same. The timing opportunities for re-direction of excitation currents in the excitation coil of "C-shaped" excitation salient pole pairs at both sides of the rotor support are also completely synchronous, and its effect is similar to that the rotating shafts of two motors in the first embodiment are integrated.

In this embodiment, the rotor adopts the dual-cantilever support structure, so that the dynamic balance is strengthened, output torque is increased, while the increase of the axial dimension of motor is limited.

Embodiment 3

This embodiment provides an AC Permanent-Magnet Switched Reluctance Motor, which has "C-SHAPED" monocoil excitation salient pole pair set up on a stator, and has a rotor consisting of a dual-sided cantilever support. The structure and setting position of "C-SHAPED" monocoil excitation salient pole pair on its stator are same with those in the second embodiment, please refer to FIGS. 13-14.

Figure 15:
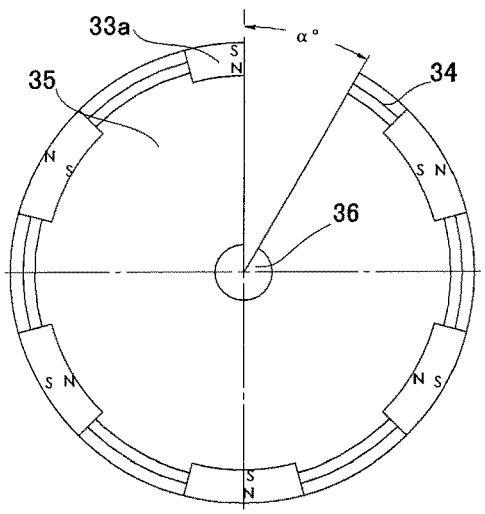
FIG. 15 shows the schematic diagram of the dislocated setting structure of dual-sided cantilever rotor support and the permanent magnet in the third embodiment of this invention.
Figure 16:
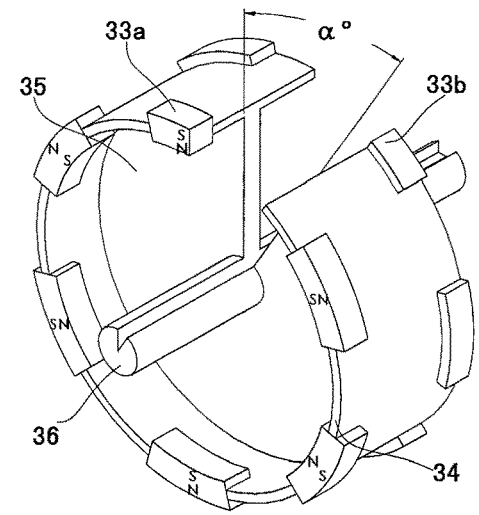
FIG. 16 shows the schematic diagram of the dislocated setting structure appearance of dual-sided cantilever rotor support and the permanent magnet in the third embodiment of this invention.

In this embodiment, the rotor consists of a rotating shaft 36 and a dual-sided cantilever rotor support. The dual-sided cantilever rotor support consists of a disc 35 and a cylinder 34; the center of the disc 35 is fixed with the rotating shaft 36; the plane of the disc is vertical to the axial line of rotating shaft 36. The axial line of the cylinder 34 is superposed with that of the rotating shaft 36; the cylinder 34 is fixedly connected at its ½ location with the disc, forming the rotor support of dual-sized cantilever structure. Six permanent magnets are fixed with equal interval at the edges of both sides of cylinder 34, the central angle between the radial center lines of six permanent magnets differs by 60 degrees, and the magnetic polarity of two neighboring permanent magnets are different. Moreover, the dislocated angle α is 30-degree between the six permanent magnets set up at the edge of the left end of cylinder 34 and the six permanent magnets set up at the edge of the right end of the cylinder, as shown in FIG. 15 and FIG. 16. The central angle differs by 30 degrees between the radial central line of permanent magnet 33a and that of the permanent magnet 33b.

In this embodiment, the permanent magnets are set up by dislocation of 30-degree central angle at the edges of both ends of the dual-sided cantilever support, so that the timing opportunities for re-direction of electric excitation currents in the excitation coil of "C-shaped" excitation salient pole pairs set up in opposite at left and right sides of the rotor support are also dislocated. In this way, the motor in this embodiment has a relatively small step angle, and this further strengthens the stability during rotation of the rotor.

Embodiment 4

This embodiment provides another AC Permanent-Magnet Switched Reluctance Motor, which has "C-shaped" monocoil excitation salient pole pair set up on a stator, and has rotor consisting of a dual-sided cantilever support. Its appearance and structure are as shown in FIGS. 20-22.

In this embodiment, the structural form of the "C-shaped" excitation salient pole pair on the stator is the same as the first embodiment, as shown in FIG. 1 and FIG. 2.

In this embodiment, eight "C-shaped" excitation salient pole pairs are divided into two groups, arranged at both sides of the disc of the rotor support respectively, and set up on the stator seat in a balanced way, as shown in FIG. 22. The two magnetic port faces of the laminated iron core 41a and the laminated iron core 41b of all "C-shaped" excitation salient pole pairs are horizontally opposite in the left and right.

Figure 17:
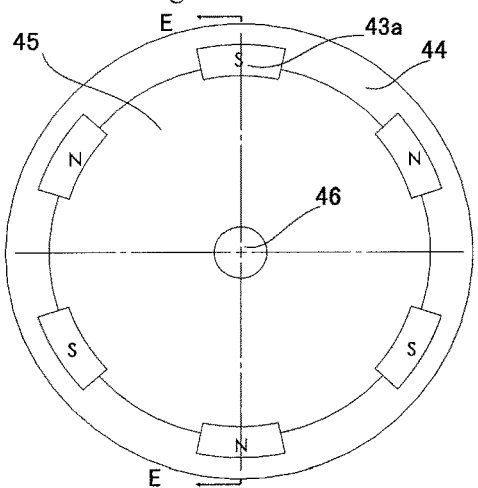
FIG. 17 shows the schematic diagram of the schematic diagram of the structure of dual-sided cantilever edge-folded rotor support and the permanent magnet in this invention.
Figure 18:
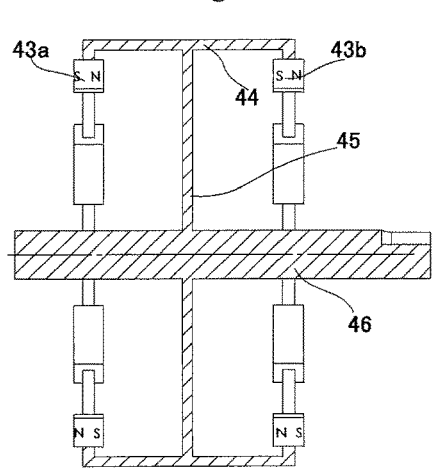
FIG. 18 shows the schematic diagram of the sectional view of the structure of dual-sided cantilever edge-folded rotor support and the permanent magnet (the sectional view in E-E direction of FIG. 17) in this invention.

In this embodiment, the rotor support consists of a disc 45 and an edge-folded cylinder 44, as shown in FIG. 17 and FIG. 19. The inner wall of the central part of the edge-folded cylinder 44 is fixedly connected with the outside edge of the disc 45, forming a "same-bottom dual-way bowl-rim inner-fold-edge" entity; the center of the disc 45 is fixedly connected with the rotating shaft 46; the plane of the disc 45 is vertical to the axial line of the rotating shaft 46; the plane of the disc 45 is vertical to the axial line of the rotating shaft 46. The axial line of the edge-folded cylinder 44 is superposed with the axial line of the rotating shaft 46, the edge-folded surface of the cylinder 44 with inner fold-edge is vertical to the axial line of the rotating shaft 46. Twelve permanent magnets are divided into two groups and fixed at the fold-edges at both ends of edge-folded cylinder in a balanced and symmetric way, and the magnetic polarity of two neighboring permanent magnets on a same rotating surface are different, as shown in FIG. 17. When the rotating shaft 46 rotates, all the permanent magnets fixed at the fold-edges of both ends of edge-folded cylinder 44 could all pass between the port faces of all "C-shaped" excitation salient pole pairs at both sides of the disc, and an air gap will be formed between the two magnet pole faces of permanent magnets and the port faces of excitation salient pole pair. When the permanent magnets 43a and 43b are located between the two port faces of the laminated iron cores 41a and 41b of the excitation salient pole pore, a shortest magnetic loop will be formed between the permanent magnet and the excitation salient pole pair.

The operating mechanism and driving method of this embodiment are the same as second embodiment, and so won't be described repeatedly here.

Embodiment 5

Figure 28:
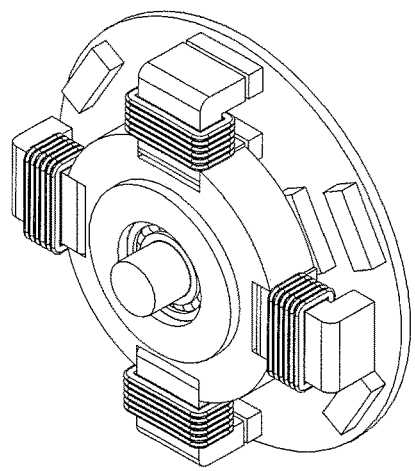
FIG. 28 shows the schematic diagram of the structure appearance of motor with permanent magnet set up at single lateral side of the disc-shaped rotor support in the fifth embodiment of this invention.
Figure 29:
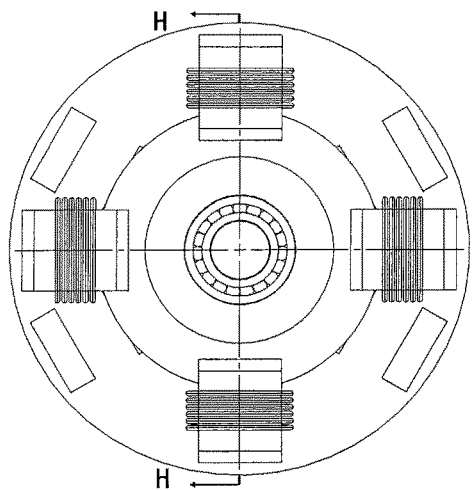
FIG. 29 shows the schematic diagram of the structure of motor with permanent magnet set up at single lateral side of the disc-shaped rotor in the fifth embodiment of this invention.
Figure 30:
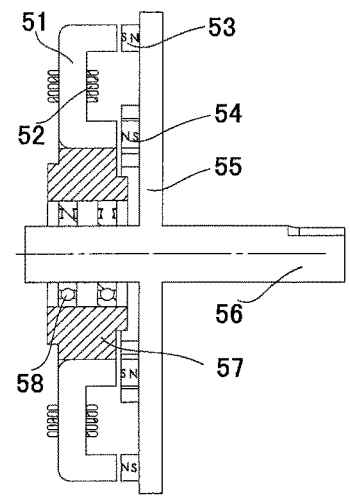
FIG. 30 shows the sectional view of the structure of motor with permanent magnet set up at single lateral side of the disc-shaped rotor support in the fifth embodiment of this invention (the sectional view in H-H direction of FIG. 29).

This embodiment provides a switched reluctance motor which has "U-shaped" monocoil excitation salient pole pair set up on a stator and has permanent magnet set up at single side of the disc of the rotor support. Its structure and appearance are as shown in FIGS. 28-30.

In this embodiment, the stator consists of a stator seat and four "U-shaped" excitation salient pole pairs, which are placed at the upside, downside, left side and right side respectively, with a different of 90-degree central angle existing among each other. Every "U-shaped" excitation salient pole pair consists of a "U-shaped" laminated iron core 51 and one group of excitation coils 52, as shown in FIG. 23 and FIG. 24. The port faces of the two salient poles of this "U-shaped" laminated iron core 51 are in the same direction.

Figure 25:
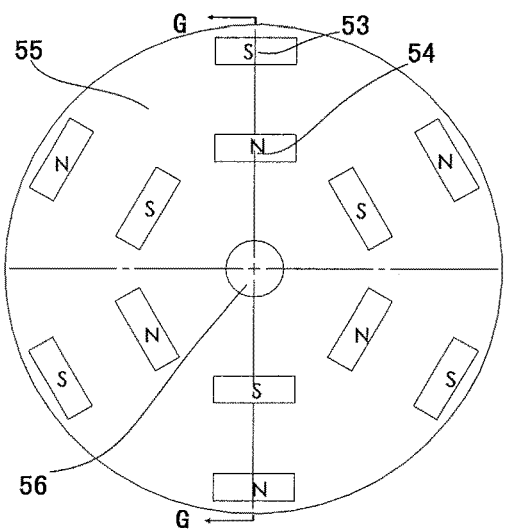
FIG. 25 shows the schematic diagram of the structure of the disc-shaped rotor support and the permanent magnet in the fifth embodiment of this invention (the permanent magnet is set up at single lateral side of the disc-shaped rotor support).
Figure 26:
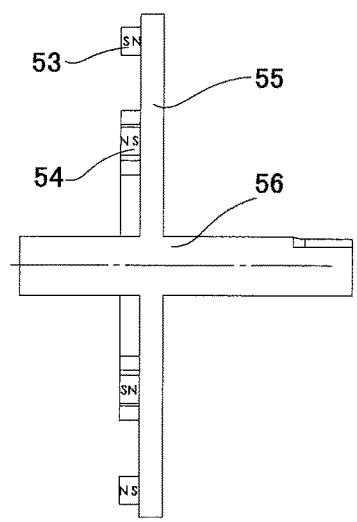
FIG. 26 shows the sectional view of the structure of the disc-shaped rotor support and the permanent magnet in the fifth embodiment of this invention (the sectional view in G-G direction of FIG. 25).
Figure 27:
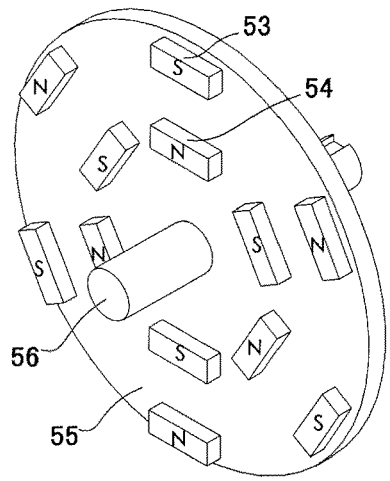
FIG. 27 shows the schematic diagram of the structure appearance of the disc-shaped rotor support and the permanent magnet in the fifth embodiment of this invention.

In this embodiment, the rotor support is a disc 55, twelve permanent magnets are set up on one lateral side of the magnetic disc 55 by an inner ring and an outer ring and with the axial line of the rotating shaft as a symmetric axial line, the interval between the inner-ring permanent magnets is the same, so is the outer-ring permanent magnets, as shown in FIG. 25 and FIG. 27. The disc 55 is magnetic, so the inner-ring permanent magnet 54 and outer-ring permanent magnet 53 set up on a same radial line form one permanent magnet salient pole pair, the magnetic polarity of two neighboring permanent magnet salient pole pairs are different, and the distance between the two salient poles of every permanent magnet salient pole pair is the same as that of the two salient poles of the "C-shaped" excitation salient pole pair on the stator.

When the rotating shaft 56 rotates, each permanent magnet salient pole pair on lateral sides of the disc will sweep over each excitation salient pole pair of the stator in turn, and the air gap will be formed between the port faces of each permanent magnet salient pole pair and the port faces of each excitation salient pole pair. When the two port faces of any permanent magnet salient pole pair on the rotor are just right superposed with the two port faces of any excitation salient pole pair on the stator, a shortest magnetic loop will be formed between this permanent magnet salient pole pair and this excitation salient pole pair.

The operating mechanism and driving control method of the motor in this embodiment are the same as the first embodiment, and so won't be described repeatedly here.

Embodiment 6

This embodiment presents a switched reluctance motor which has "U-shaped" monocoil excitation salient pole pair set up on a stator and has permanent magnets set up at both sides of the disc of the rotor support. The sectional view of its appearance and structure are as shown in FIGS. 34-36.

Figure 34:
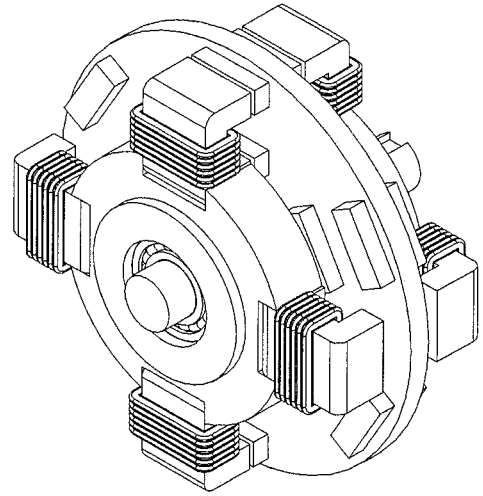
FIG. 34 shows the schematic diagram of the structure appearance of the motor of "U-SHAPED" monocoil excitation salient pole pair and with permanent magnets set up at both sides of the disc-shaped rotor support in the sixth embodiment of this invention.
Figure 35:
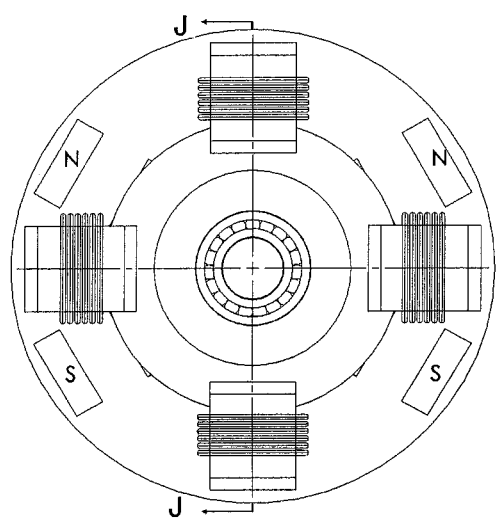
FIG. 35 shows the schematic diagram of motor structure in the sixth embodiment of this invention.
Figure 36:
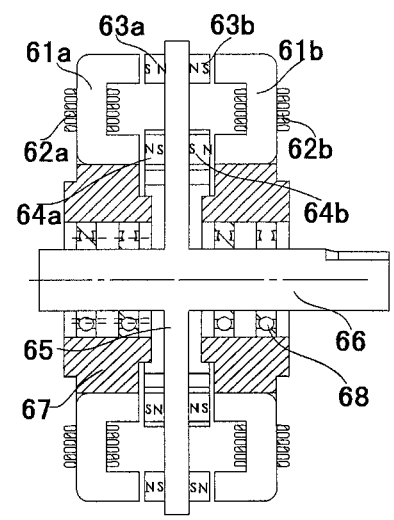
FIG. 36 shows the sectional view of the motor structure in the sixth embodiment of this invention (the sectional view in J-J direction of FIG. 35).

In this embodiment, the stator consists of a stator seat and eight "U-shaped" excitation salient pole pairs, as shown in FIG. 34 and FIG. 36. The eight "U-shaped" excitation salient pole pairs are divided into two groups, which are placed at both sides of the disc of the rotor support. The four "U-shaped" excitation salient pole pairs in each group are placed at the upside, downside, left side and right side respectively, with a difference of 90-degree central angle existing among each other.

Figure 31:
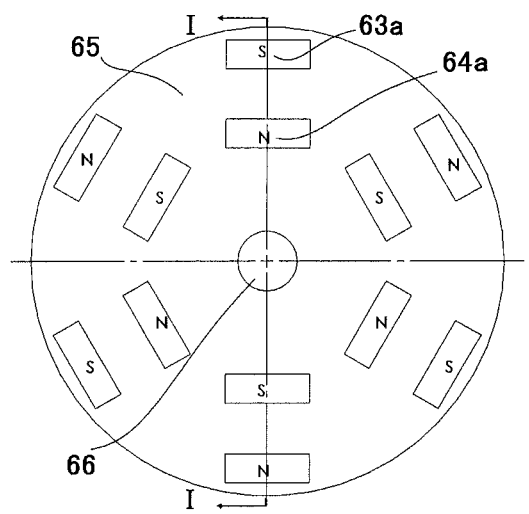
FIG. 31 shows the schematic diagram of the structure of the disc-shaped rotor support and the permanent magnet in the sixth embodiment of this invention (the permanent magnets are set up at both lateral sides of the disc-shaped rotor support).
Figure 32:
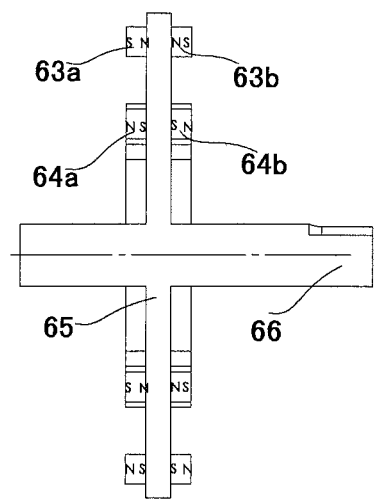
FIG. 32 shows the sectional view of the structure of the disc-shaped rotor support and the permanent magnet in the sixth embodiment (the sectional view in I-I direction of FIG. 31).
Figure 33:
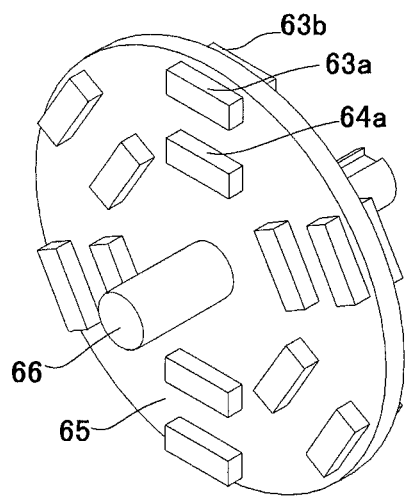
FIG. 33 shows the schematic diagram of the appearance structure of the disc-shaped rotor support and the permanent magnet in the sixth embodiment of this invention.

In this embodiment, the rotor support is the disc 65, and 24 permanent magnets are set up at both lateral sides of the magnetic disc 65 by an inner ring and outer ring with the axial line of the rotating shaft 66 as a symmetric axial line. The interval between inner-ring permanent magnets is equal, so is the interval between the outer-ring permanent magnets. The disc 65 is magnetic, so the inner-ring permanent magnet 64a and outer-ring permanent magnet 63a set up on a same radial line form one permanent magnet salient pole pair. In this way, six permanent magnet salient pole pairs are formed on one lateral side of the magnetic disc 65, and the magnetic polarity of two neighboring permanent magnet salient pole pairs are different, as shown in FIG. 31. The distance between the two salient poles of every permanent magnet salient pole pair is the same as that between the two salient poles of the laminated iron core of excitation salient pole pair on the stator.

When the rotating shaft rotates, each permanent magnet salient pole pair on both lateral sides of the disc 65 will sweep over each excitation salient pole pair on the stator in turn, and an air gap will be formed between the port faces of each permanent magnet salient pole pair and the port faces of each excitation salient pole pair. When the two port faces of any one permanent magnet salient pole pair on the rotor are just superposed with the two port faces of any excitation salient pole pair on the stator, a shortest magnetic loop will be formed between this permanent magnet salient pole pair and this excitation salient pole pair.

In this embodiment, the "U-shaped" excitation salient pole pairs at both sides of the disc of the rotor support are completely the same as the permanent magnet salient pole pairs on the two lateral sides of the disc in terms of mutual action mechanism and action opportunity, and the timing opportunities for re-direction of excitation currents in the excitation coil of the "U-shaped" excitation salient pole pairs at both sides of the disc of the rotor support are also completely synchronous, and the effect is similar to that the rotating shafts of two motors in the fifth embodiment are integrated. The dynamic balance is strengthened, output torque is increased, while the increase in axial size of the motor is limited.

In this embodiment, the radial central lines of the permanent magnet salient pole pairs at both sides of the disc of the rotor support could also be set up by a dislocation of 30-degree angle, namely there is a dislocation of 30-degree angle between the radial central line of the six permanent magnet salient pole pairs at the left side of the disc of the rotor support and the radial central line of the six permanent magnet salient pole pairs at the right side of the disc of the rotor support, so that the motor in this embodiment has a relatively small step angle, further enhancing the stability during rotation of the rotor.

The rotating mechanism and driving control method of the motor in this embodiment are the same as the first embodiment, and so won't be described repeatedly here.

Embodiment 7

Figure 39:
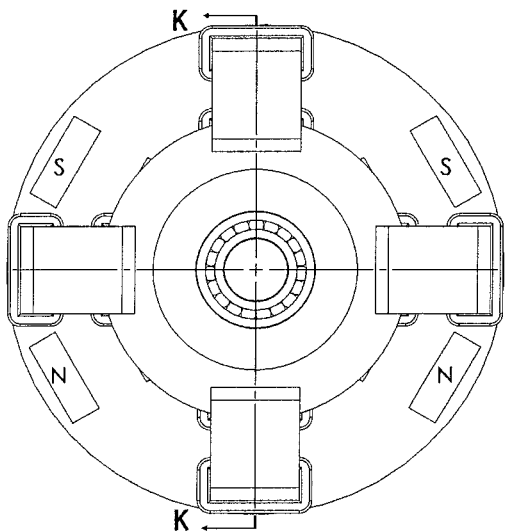
FIG. 39 shows the schematic diagram of the structure of the switched reluctance motor with excitation salient pole pair of "U-SHAPED" twin-coil series excitation and with permanent magnet set up on single lateral side of the disc-shaped rotor support in the seventh embodiment of this invention.
Figure 40:
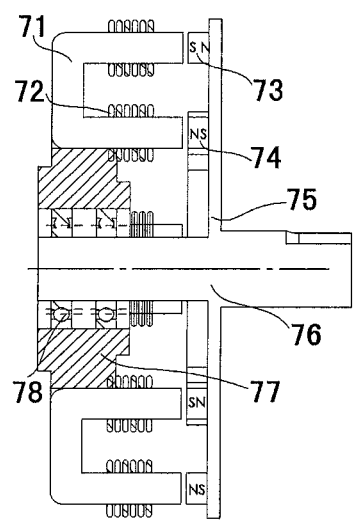
FIG. 40 shows the sectional view of the motor structure in the seventh embodiment of this invention (the sectional view in K-K direction of FIG. 39).
Figure 41:
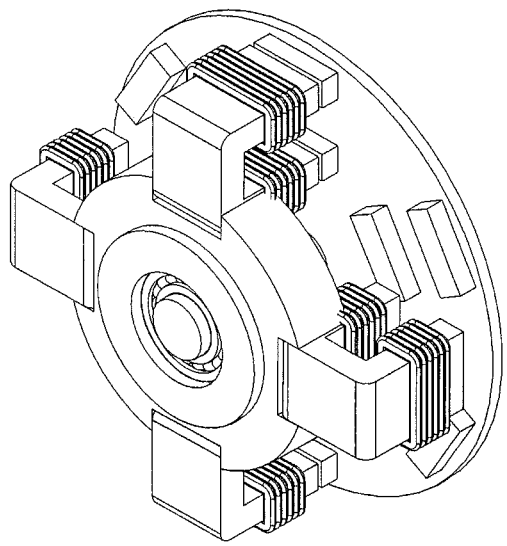
FIG. 41 shows the schematic diagram of the structure appearance in the seventh embodiment of this invention.

This embodiment provides a switched reluctance motor which has "U-shaped" twin-coil excitation salient pole pair set up on a stator and has permanent magnet set up on single side of the disc of the rotor support, and its structure and appearance are as shown in FIGS. 39-41.

Figure 37:
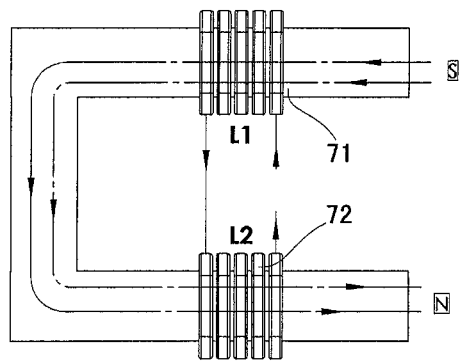
FIG. 37 shows the schematic diagram of the structure of excitation salient pole pair of "U-SHAPED" twin-coil series excitation in this invention (the port faces of magnetic pole are in the same direction, and L1 coil is charged with excitation current in the forward/positive direction).
Figure 38:
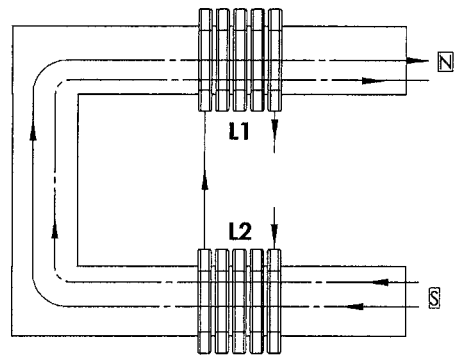
FIG. 38 shows the schematic diagram of the structure of excitation salient pole pair of "U-SHAPED" twin-coil series excitation in this invention (the port faces of magnetic pole are in the same direction, and L2 coil is charged with excitation current in the opposite/negative direction).

In this embodiment, the stator consists of a stator seat and four "U-shaped" excitation salient pole pairs, which are placed at the upside, downside, left side and right side respectively, with a difference of 90-degree central angle existing among each other. As shown in FIG. 37 and FIG. 38, every "U-shaped" excitation salient pole pair consists of one "U-shaped" laminated iron core 71 and two groups of excitation coils 72; excitation coils L1 and L2 are wounded around the upper framework and lower framework of the "U-shaped" laminated iron core respectively; the excitation coils L1 and L2 are connected in series; and the port faces of the two salient poles of this "U-shaped" laminated iron core are in the same direction. When a positive excitation current is input into the excitation coils L1 and L2, the port face of the upper salient pole of this "U-shaped" excitation salient pole pair will present the magnetic polarity S, and the port face of the lower salient pole will present the magnetic polarity N, as shown in FIG. 37. When a reverse excitation current is input into the excitation coils L1 and L2, the port face of the upper salient pole of "U-shaped" excitation salient pole pair will present the magnet polarity N, and the port face of the lower salient pole will present the magnetic polarity S, as shown in FIG. 38. In this way, the magnetic potential will be formed that the magnetic polarity changes alternatively on the port faces of two salient poles of "U-shaped" excitation salient pole pair.

In this embodiment, the rotor support is the disc 75, twelve permanent magnets are set up on one lateral side of the magnetic disc 75 by an inner ring and an outer ring and with the axial line of the rotating shaft 76 as a symmetric axial line, and the mutual interval among inner-ring permanent magnets is equal, so is the case of the outer-ring permanent magnets. The disc is magnetic, so the inner-ring permanent magnet 74 and outer-ring permanent magnet 73 set up on the same radial line form one permanent magnet salient pole pair, and the magnetic polarity of two neighboring permanent magnet salient pole pairs are different, as shown in FIG. 25 and FIG. 27. The distance between two salient poles of every permanent magnet salient pole pair is the same as that between the two salient poles of the "U-shaped" excitation salient pole pair on the stator.

When the rotating shaft 76 rotates, each permanent magnet salient pole pair on lateral side of the disc 75 will sweep over each "U-SHAPED" excitation salient pole pair on the stator in turn, and an air gap will be formed between the port faces of each permanent magnet salient pole pair and the port faces of each excitation salient pole pair. When the two port faces of any one permanent magnet salient pole pair on the rotor are just superposed with the two port faces of any one excitation salient pole pair on the stator, a shortest magnetic loop will be formed between this permanent magnet salient pole pair and this excitation salient pole pair.

According to the comparison between this embodiment and the first embodiment, the laminated iron core of the excitation salient pole pair in this embodiment is "U-shaped", and its two port faces are in the same direction. Another difference rests with that, in this embodiment, the excitation currents of different directions are respectively input into the excitation coils L1 and L2 in series connection to change the magnetic polarity of the port faces of excitation salient pole pair, while in the first embodiment, the magnetic polarity of the port faces of excitation salient pole pair is changed by changing the excitation current direction of the same excitation coil.

The operating mechanism and driving control method of the motor in this embodiment are similar to the first embodiment, and so won't be described repeatedly here.

Embodiment 8

This embodiment provides one switched reluctance motor which has "U-shaped" twin-coil excitation salient pole pair set up on a stator and has permanent magnets set up on both sides of the disc of a rotor support.

The structure of this embodiment is similar to that of the sixth embodiment, and the difference rests with that, "U-shaped" twin-coil excitation salient pole pair is set up on the stator.

In this embodiment, the magnetic polarity of the "U-shaped" twin-coil excitation salient pole pair set up on the stator is changed by alternatively inputting excitation current into the coils L1 and L2, as shown in FIG. 37 and FIG. 38.

The operating mechanism and driving control method of motor in this embodiment are similar to the first embodiment, and so won't be described repeatedly here.

For the sake of convenient description, in the motors presented in the abovementioned embodiments 1, 5 and 7 of this invention, there are four excitation salient pole pairs on the stator, and six permanent magnets or permanent magnet salient pole pairs on the rotor, but the embodiments of this invention are not limited to the proportional relationship of this number of excitation salient pole pairs on the stator and the number of permanent magnets or permanent magnetic salient poles on the rotor. According to the requirements on the actual size and rated power of motors, multiple options of proportional relationship may be chosen. Given that, the number of excitation salient pole pairs on the stator is N, the number of permanent magnets or "permanent magnet salient pole pairs" on the rotor is M, the relationship between N and M is that M=kN, and in this formula, M is an even number of equal to or bigger than 2, N is a natural number equal to or bigger than 2, When N is an odd number, k will be an even number, when N is an even number, k will be a natural number, and the ratio of M/N is not a positive integer. The motors presented in the abovementioned embodiments 2, 3, 4 and 6 of this invention are of the symmetric coupling structure in embodiments 1, 5 and 7, and so also follow the number rule of the abovementioned excitation salient pole pair on stator and the permanent magnet or permanent magnet salient pole pair on rotor.

Embodiment 9

Figure 47:
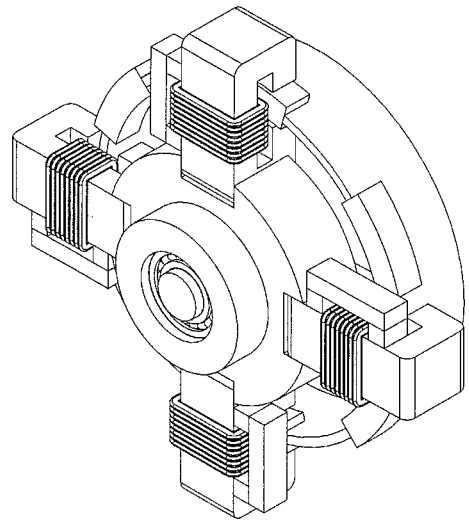
FIG. 47 shows the schematic diagram of the structure appearance of single-cantilever unipolar permanent-magnet synergistic reluctance motor in the ninth embodiment of this invention.
Figure 48:
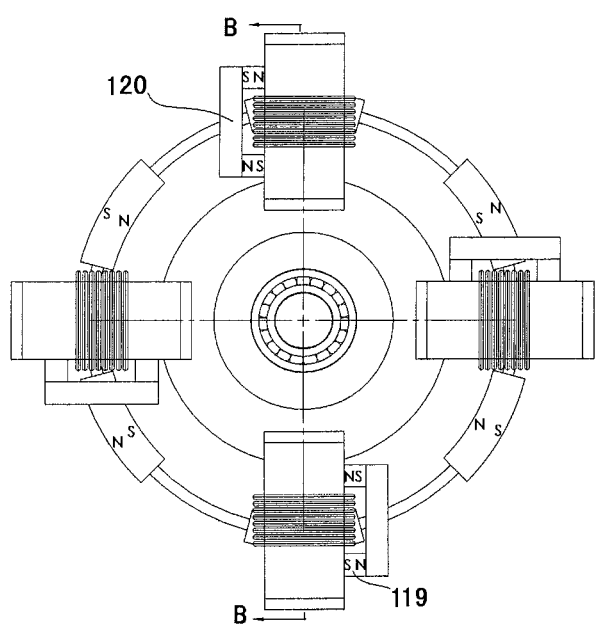
FIG. 48 shows the schematic diagram of the structure of single-cantilever unipolar permanent-magnet synergistic reluctance motor in the ninth embodiment of this invention.
Figure 49:
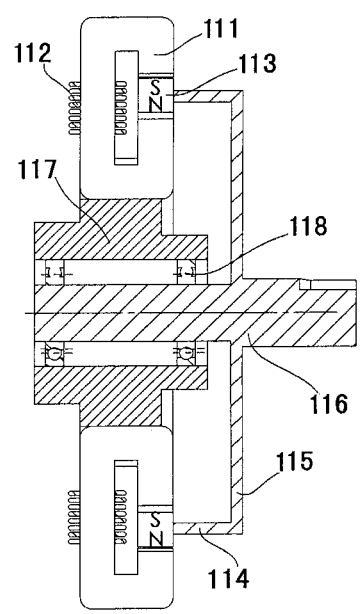
FIG. 49 shows the sectional view of the structure of single-cantilever unipolar permanent-magnet synergistic reluctance motor in the ninth embodiment of this invention (the sectional view in B-B direction of FIG. 48).

This embodiment provides a unipolar permanent-magnet synergistic reluctance motor with single-sided cantilever support for rotor and compound excitation salient pole pair adopted for stator, and its structure and appearance are as shown in FIGS. 47-49.

Figure 42:
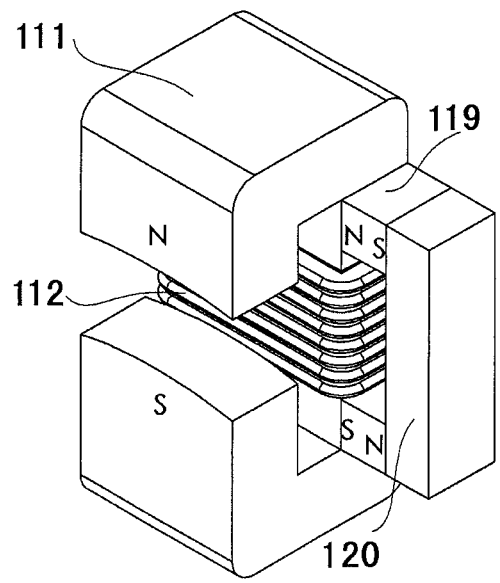
FIG. 42 shows the schematic diagram of the appearance of compound excitation salient pole pair excited by monocoil in this invention (the upper and lower port faces of magnetic pole are opposite).
Figure 43:
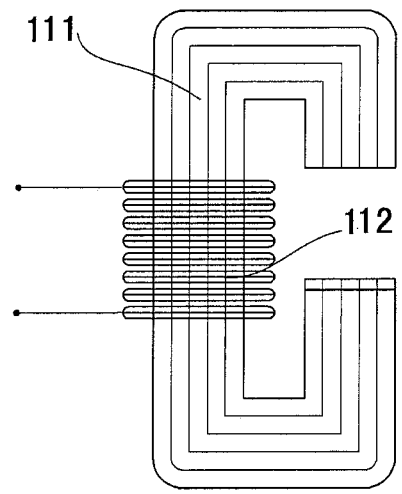
FIG. 43 shows the schematic diagram of the structure of "C-SHAPED" laminated iron core and excitation coil of the compound excitation salient pole pair excited by monocoil in this invention.

In this embodiment, stator consists of a stator seat 117 and four "compound excitation salient pole pairs". The four "compound excitation salient pole pairs" are placed respectively at the upside, downside, left side and right side, with a difference of 90-degree central angle existing mutually. The "compound excitation salient pole pair" consists of one "C-SHAPED" laminated iron core 111, one excitation coil 112 and two permanent magnet modules 119 and 120, as shown in FIG. 43, the two port faces of "C-SHAPED laminated iron core" are opposite in the upside and downside, and the two port faces are of curved surface. When the input excitation current of excitation coil is zero, the upper and lower port faces of "C-shaped" laminated iron core will not present magnetic polarity, and the section passing through the "C-shaped" laminated iron core of the two magnetic poles of permanent magnet module will form closed permanent magnet flux. When the excitation coil is input an excitation current, the magnetic polarity N will be presented immediately at the upper port face of "C-shaped" laminated iron core, and meanwhile, the magnetic polarity S will be presented immediately at the lower port face of "C-shaped" laminated iron core, as shown in FIG. 42. Meanwhile, due to the function of excitation current, the original static-closed magnetic line of permanent magnet module will be opened, and here, the compound excitation effect of permanent magnet excitation and coil excitation will be formed at the upper and lower port faces of "C-shaped" laminated iron core.

Figure 44:
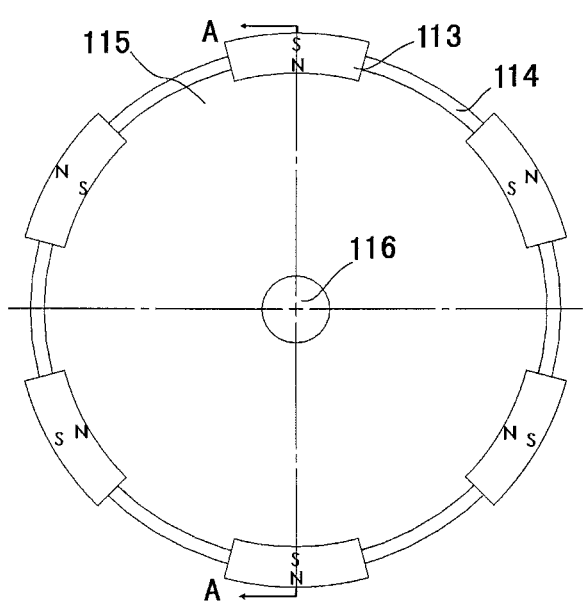
FIG. 44 shows the schematic diagram of the structure of single-cantilever rotor support and the permanent magnet in this invention.
Figure 45:
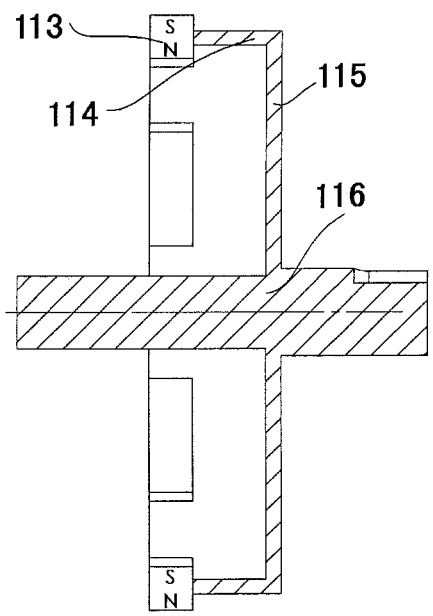
FIG. 45 shows the sectional view of the structure of single-cantilever rotor support and the permanent magnet in this invention (the sectional view in A-A direction of FIG. 44).
Figure 46:
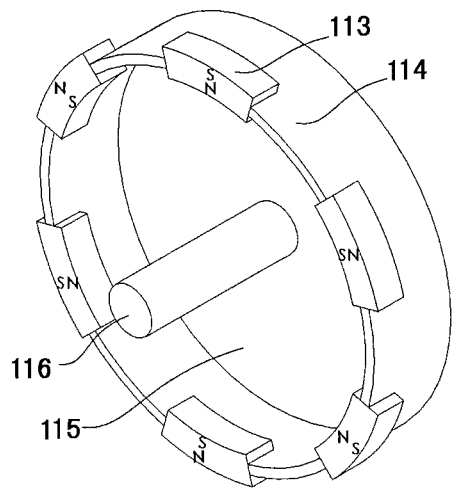
FIG. 46 shows the schematic diagram of the structure appearance of single-cantilever rotor support and the permanent magnet in this invention.

In this embodiment, the rotor consists of a rotating shaft and single-sided cantilever rotor support, and the single-sided cantilever rotor support consists of a disc 115 and a cylinder 114, as shown in FIG. 44-46, forming a "single-mouth bowl-shaped" rotor support; the center of the disc is fixed with the rotating shaft 116; the plane of the disc is vertical to the axial line of the rotating shaft; the axial line of the cylinder is superposed with that of the rotating shaft; the edge of one end of the cylinder is fixedly connected with the disc, forming the rotor support of single-sided cantilever structure; at the edge of the other end of the cylinder, six permanent magnets 113 are fixed with equal interval, and the magnetic polarity setting of permanent magnets is as shown in FIG. 44; there is a difference of 60-degree central angle among the radial central lines of every permanent magnet, the magnetic polarity of two neighboring permanent magnets are different, and the radiant of the two magnet pole faces of every permanent magnet is accordant with the radian of the two port faces of "C-shaped" laminated iron core of the compound excitation salient pole pair. When the rotating shaft rotates, the permanent magnets fixed at the tail end of the rotor support could pass from between the port of each compound excitation salient pole pair on the stator, and an air gap of the same clearance exists between the two magnet pole faces of each permanent magnet and the two port faces of each "C-shaped" laminated iron core.

The driving mechanism of this embodiment is that, when an excitation current is input into the excitation coil of the compound excitation salient pole pair above the stator, the upper port face of the "C-shaped" laminated iron core of this compound excitation salient pole pair will present N-pole magnetic property, and the lower port face will present S-pole magnetic property. At this moment, the magnetic potential presented by the upper and lower port faces of "C-shaped" laminated iron core is the compound superposition of the excitation flux of the excitation coil in this compound excitation salient pole pair and the permanent magnet flux of permanent magnet module. This compound excitation salient pole pair will produce magnetic attractive force to the permanent magnet 113 with magnetic polarity S of external section and magnetic polarity N of internal section on the rotor cantilever, and form rotating torque of the rotor. When the permanent magnet 113 with magnetic polarity S of external section and magnetic polarity N of internal section is located between the upper and lower port faces of the "C-shaped" laminated iron core of this compound excitation salient pole pair, as shown in FIG. 49, the compound magnetic flux of this compound excitation salient pole pair will form a closed magnetic loop with relatively small reluctance through the air gap on the curved surface above the permanent magnet, this permanent magnet, as well as the air gap on the curved surface below the permanent magnet. When the permanent magnet is in alignment with the port faces of the "C-shaped" laminated iron core of the compound excitation salient pole pair, the motor driving device will interrupt the excitation current of the excitation coil of this compound excitation salient pole pair, and make the magnetic polarity of upper and lower port faces of "C-shaped" laminated iron core of this compound excitation salient pole pair disappear. At this moment, the permanent magnet between the ports of "C-shaped" laminated iron core of this compound excitation salient pole pair will not be subject to the magnetic attractive force of this compound excitation salient pole pair any more, thus avoiding the formation of negative torque. When the permanent magnet with magnetic polarity N of external section and magnetic polarity S of internal section is transferred to between the ports of "C-shaped" laminated iron cores of this compound excitation salient pole pair, since the excitation current in the excitation coil of this compound excitation salient pole pair is zero during this period of time, this compound excitation salient pole pair won't produce repelling force to it, and this avoids the appearance of negative torque. Once the permanent magnet with magnetic polarity N of external section and magnetic polarity S of internal section deviates from the alignment position between the ports of "C-shaped" laminated iron core of this compound excitation salient pole pair, the motor driving device will input an excitation current to the excitation coil of this compound excitation salient pole pair once again to form magnetic potential of compound excitation between the ports of "C-shaped" laminated iron core of this compound excitation salient pole pair once again. For the magnetic polarity of the upper port is N and that of the lower port is S, the "C-shaped" laminated iron core would form magnetic repulsion force due to "like charges repel each other" against the permanent magnet having just deviated from alignment position, and meanwhile, this compound excitation salient pole pair will form magnetic attraction due to "unlike charges attract each other" to the permanent magnet rotating in. In this embodiment, each compound excitation salient pole pair is of magnetic isolation mutually, and the excitation coil of each compound excitation salient pole pair is independent, so the action process and action mechanism of the abovementioned compound excitation salient pole pair and the permanent magnet on the rotor are suitable for any other compound excitation salient pole pair on the stator. The motor driving device, by controlling the ON/OFF of current of the excitation coil of each compound excitation salient pole pair on the stator in a real-time way, could make each compound excitation salient pole pair always in the work state of "sucking the rear and pushing the front". In this embodiment, there are four compound excitation salient pole pairs on the stator seat, and six permanent magnets on rotor cantilever support. Each time when the rotating shaft rotates by 30-degree centrifugal angle, two compound excitation salient pole pairs will be in alignment with two permanent magnets on the rotor support, that's to say, the permanent magnets will be located between the upper and lower port faces of the compound excitation salient pole pair, in order to realize the continuous rotation of the rotor, and the rotating shaft of the motor will output continuous torque.

In this embodiment, the motor dexterously imports the intrinsic permanent magnetic energy of permanent magnet assembly to the two port faces of the "C-shaped" laminated iron cores of excitation salient pole pair, so that the magnetic energy of permanent magnets could also participate in the process of acting on the permanent magnets on the rotor, thus further raising the energy efficiency of the motor.

Embodiment 10

Figure 53:
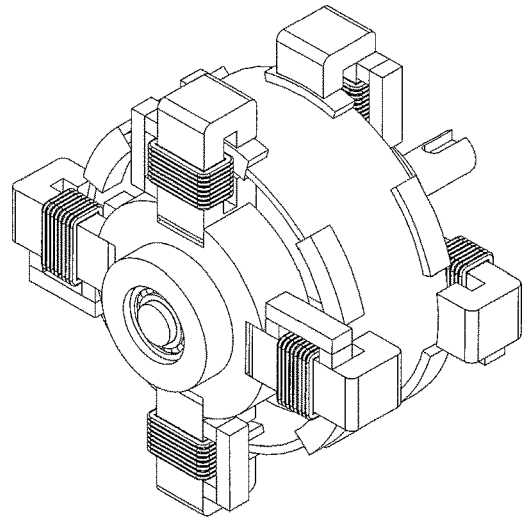
FIG. 53 shows the schematic diagram of the structure appearance of dual-cantilever rotor support unipolar permanent-magnet synergistic reluctance motor in the tenth embodiment of this invention.
Figure 54:
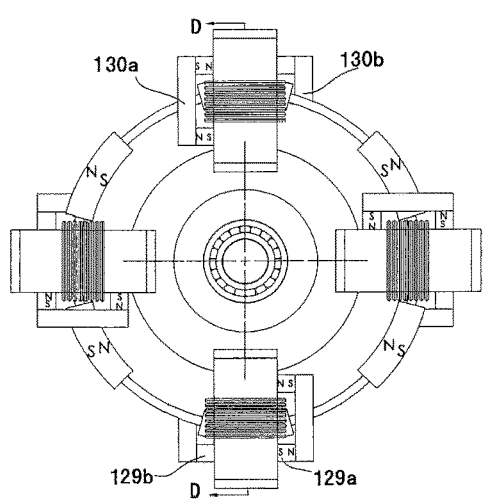
FIG. 54 shows the schematic diagram of the structure of dual-cantilever rotor support unipolar permanent-magnet synergistic reluctance motor in the tenth embodiment of this invention.
Figure 55:
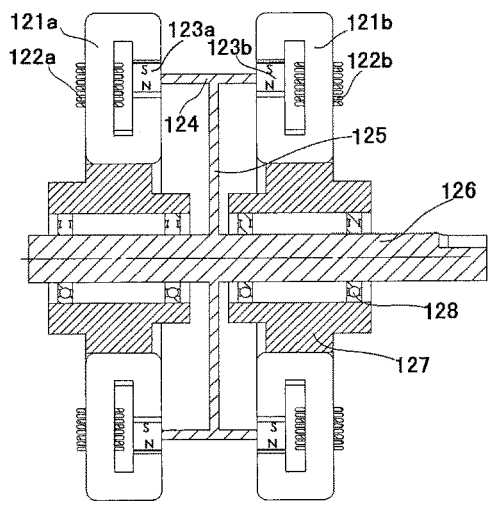
FIG. 55 shows the sectional view of the structure of dual-cantilever rotor support unipolar permanent-magnet synergistic reluctance motor in the tenth embodiment of this invention (the sectional view in D-D direction of FIG. 54).

This embodiment provides a permanent-magnet synergistic reluctance motor with dual-sided cantilever support for rotor and unipolar compound excitation salient polar pair on stator. Its appearance and structure are as shown in FIGS. 53-55.

This embodiment is a special case of the ninth embodiment, and it is of the structure of combining the couplings of two motors presented in the ninth embodiment.

Figure 50:
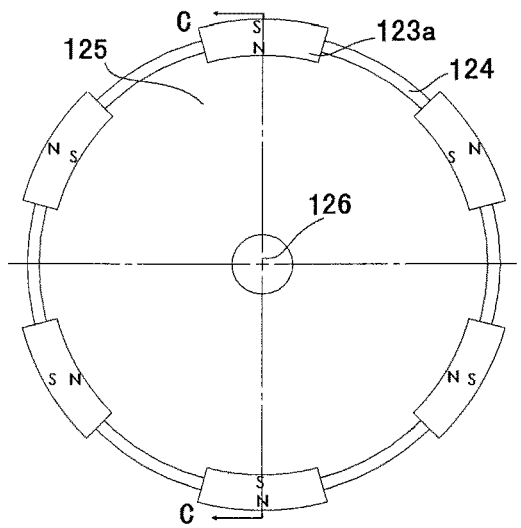
FIG. 50 shows the schematic diagram of the structure of dual-cantilever rotor support and the permanent magnet in this invention.
Figure 51:
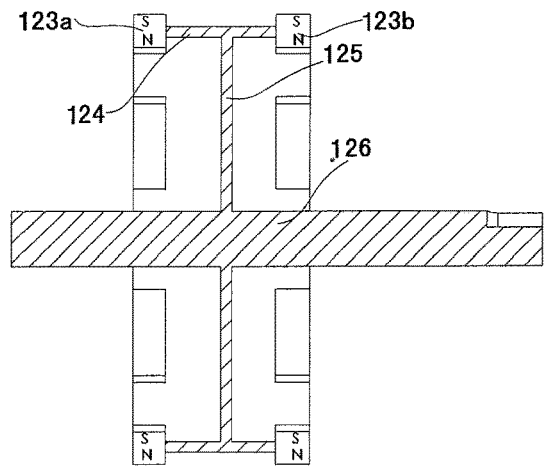
FIG. 51 shows the sectional view of the structure of dual-cantilever rotor support and the permanent magnet in this invention (the sectional view in C-C direction of FIG. 50).
Figure 52:
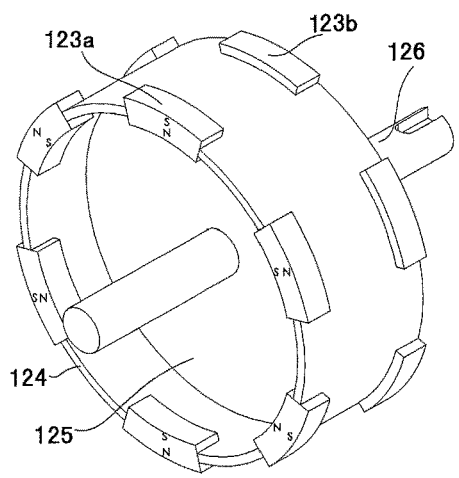
FIG. 52 shows the schematic diagram of the structure appearance of dual-cantilever rotor support and the permanent magnet in this invention.

This embodiment adopts a dual-sided cantilever rotor support, and its structure is as shown in FIGS. 50-52. The magnetic polarity of two neighboring permanent magnets at the same side of support and on the same rotating surface are different, while the magnetic polarity of two permanent magnets at both sides of the support and at the same central angle position are the same.

In this embodiment, the eight compound excitation salient pole pairs on the motor stator are divided into two groups, which are completely symmetric and balanced at the left and right sides of the disc, with the disc in the rotor support as the symmetric surface.

In this embodiment, the action process and action mechanism between each compound excitation salient pole pair on the stator and each permanent magnet on the rotor as well as the control method of motor driving device are the same as those in the ninth embodiment, and so won't be described repeatedly here.

This embodiment enhances the output power of motor, and correspondingly, strengthens the synergy effect of magnetic energy of permanent magnets.

Embodiment 11

This embodiment provides another kind of permanent-magnet synergistic reluctance motor with dual-sided cantilever support for rotor and unipolar compound excitation salient pole pair on stator. The structure and setting position of the compound excitation salient pole pair on the stator are the same as the nineteenth embodiment (refer to FIGS. 54-55).

Figure 56:
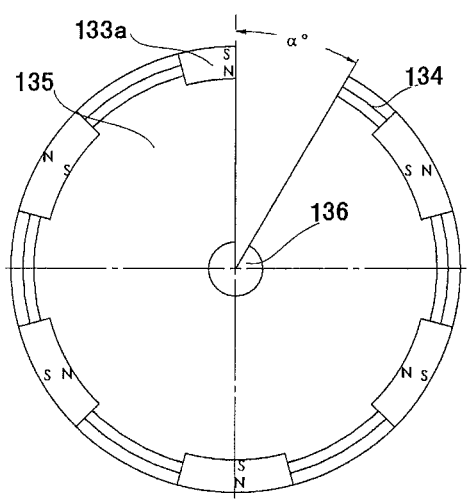
FIG. 56 shows the schematic diagram of the dislocated setting structure of dual-cantilever rotor support and the permanent magnet in the eleventh embodiment of this invention.
Figure 57:
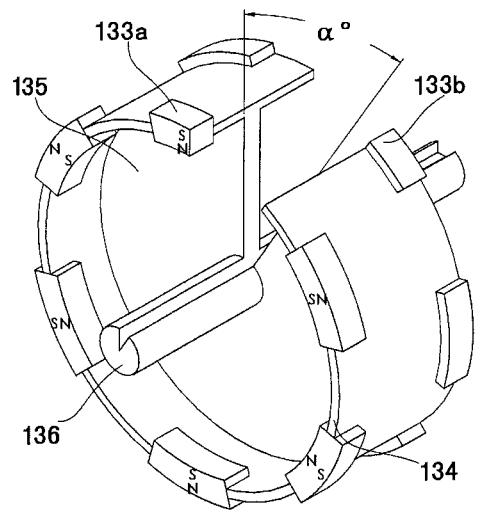
FIG. 57 shows the schematic diagram of the dislocated setting structure appearance of dual-cantilever rotor support and the permanent magnet in the eleventh embodiment of this invention.

The difference of this embodiment from the tenth embodiment rests with that, the setting rule of permanent magnets on dual-sided cantilever support are different, as shown in FIG. 56 and FIG. 57, there is still a difference of 60-degree central angle mutually among the radial center line of the six permanent magnets at one side of the cantilever support, and the magnetic polarity of two neighboring permanent magnets are different, but the six permanent magnets at one end of cantilever support and the six permanent magnets at the other end of cantilever support are not at the same central angle position, but are mutually dislocated by a central angle, as shown in FIG. 57, the radial center line of permanent magnet 133a and that of the permanent magnet 133b are dislocated by 30-degree central angle.

In this embodiment, the permanent magnets at both ends of rotor cantilever support are dislocated by 30 degrees, so each time when the rotating shaft 136 rotates by 15 degrees, the permanent magnets on the rotor cantilever support will be in alignment with the compound excitation salient pole pair on the stator, and the action process and action mechanism between each compound excitation salient pole pair on the stator and each permanent magnet on the rotor, as well as the control method of motor driving device are the same as the ninth embodiment, and so won't be described repeatedly here.

In this embodiment, permanent magnets are set up by dislocation of 30-degree central angle along the edges of both ends of dual-sized cantilever support, so that the opportunities are also staggered for re-direction of electric excitation currents in the excitation coil of compound excitation salient pole pairs at the left and right sides of the rotor support. In this way, the motor in this embodiment has relatively small step angle, and this further enhances the stability during rotation of the rotor.

Embodiment 12

Figure 60:
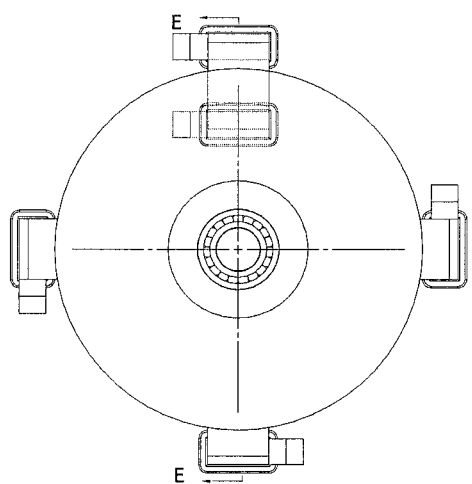
FIG. 60 shows the schematic diagram of the structure of single-cantilever bipolar permanent-magnet synergistic reluctance motor in the twelfth embodiment of this invention.
Figure 61:
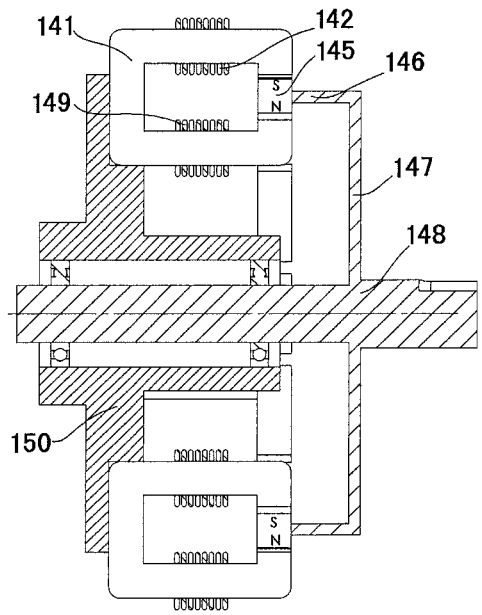
FIG. 61 shows the sectional view of the structure of single-cantilever bipolar permanent-magnet synergistic reluctance motor in the twelfth embodiment of this invention (the sectional view in E-E direction of FIG. 60).
Figure 62:
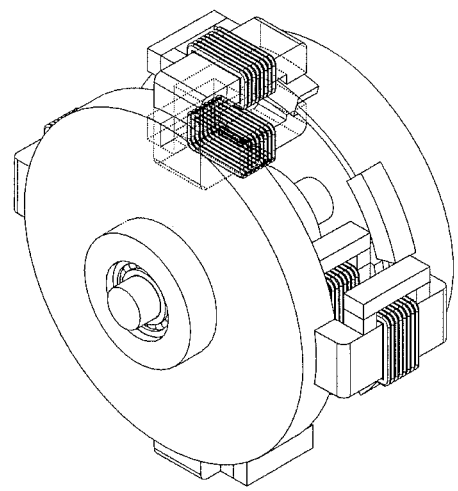
FIG. 62 shows the schematic diagram of the structure appearance of single-cantilever bipolar permanent-magnet synergistic reluctance motor in the twelfth embodiment of this invention.

This embodiment provides a permanent-magnet synergistic reluctance motor with single-sided cantilever support for rotor and twin-coil-excitation dual-polarity compound excitation salient pole pair on the stator. Its appearance and structure are as shown in FIGS. 60-62.

Figure 58:
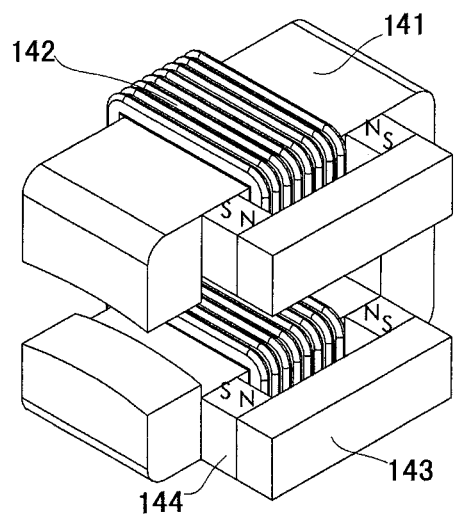
FIG. 58 shows the schematic diagram of the structure appearance of twin-coil dual-polarity compound excitation salient pole pair in this invention (the upper and lower port faces of magnetic pole are opposite).
Figure 59:
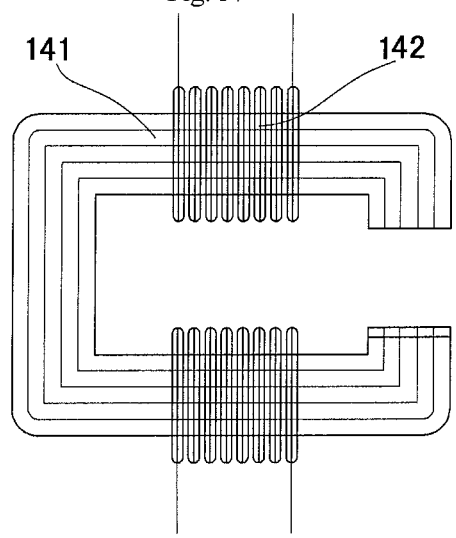
FIG. 59 shows the schematic diagram of the structure of "C-SHAPED" laminated iron core and excitation coil in twin-coil dual-polarity compound excitation salient pole pair.

In this embodiment, the stator consists of a stator seat 150 and four "compound excitation salient pole pairs", which are set up at set up at the upside, downside, left side and right side respectively, with a distance of 90-degree central angle existing mutually. Every compound excitation salient pole pair consists of one "C-SHAPED" laminated iron core 141, two groups of excitation coil 142 and two permanent magnet assemblies 143 and 144, as shown in FIG. 58 and FIG. 59, the upper and lower port faces of two salient poles of this "C-shaped" laminated iron core are opposite, and two port faces are of curved surface. Two groups of excitation coil are wound around the periphery of two parallel frames of the "C-shaped" laminated iron core, the magnetic pole S and magnetic pole N of two permanent magnet assemblies cross two groups of excitation oil respectively, and the magnetic pole S and magnetic pole N of two permanent magnet assemblies closely cling to the laminated section of the "C-shaped" laminated iron core.

If the excitation current input into the excitation coils L1 and L2 is zero, magnetic potential won't be presented on the upper and lower port faces of the "C-shaped" laminated iron cores, and the partial section passing through the "C-shaped" laminated iron core of the two magnetic poles of the upper and lower permanent magnets will form a closed permanent magnet flux.

When an excitation current is input into the excitation coil L1, and the excitation current of the excitation coil L2 is zero, magnetic potential will be formed in the "C-shaped" laminated iron core, and magnetic polarity N/S will be presented immediately on the upper/lower port face of the "C-shaped" laminated iron core, and meanwhile, due to the function of excitation current, the originally static closed magnetic line of the upper permanent magnet assembly will be opened, and here, the compound excitation effect of the permanent magnet flux of upper permanent magnet and the excitation flux of excitation coil L1 at the upper and lower port faces of the "C-shaped" laminated iron core.

When an excitation current is input into the excitation coil L2, and the excitation current of the excitation coil L1 is zero, and magnetic polarity S/N will be presented immediately on the upper/lower port face of the "C-shaped" laminated iron core, and meanwhile, due to the function of excitation current, the originally static closed magnetic line of the lower permanent magnet assembly will be opened, and here, the compound excitation effect of the permanent magnet flux of lower permanent magnet and the excitation flux of excitation coil L2 at the upper and lower port faces of the "C-shaped" laminated iron core.

In this embodiment, the rotor consists of a rotating shaft and single-sided cantilever rotor support, as shown in FIGS. 44-46, and the magnetic polarity setting of permanent magnets is as shown in FIG. 44. A difference of 60-degree central angle exists among the radial center lines of every permanent magnet, the magnetic polarity of two neighboring permanent magnets are different, and the radian of two magnet pole faces of each permanent magnet is consistent with the radian of two port faces of the "C-shaped" laminated iron core. When the rotating shaft rotates, the permanent magnets fixed at the tail end of a rotor support could pass through the port of each compound excitation salient pole pair on the stator, and an air gap of the same clearance will exist between the two magnet pole faces of each permanent magnet and the two port faces of each "C-shaped" laminated iron core.

The driving mechanism of this mechanism is that, when an excitation current is input into the excitation coil L1 and excitation coil L2 of the compound excitation salient pole pair in turn, the magnetic polarity of the upper and lower port faces of "C-shaped" laminated iron core of this compound excitation salient pole pair will change, and thus form dual-polarity compound excitation salient pole pair. When an excitation current is input into the excitation coil L1, compound N-pole/S-pole magnetic potential will be presented on the upper/lower port face of "C-shaped" laminated iron core of the compound excitation salient pole pair, as shown in FIG. 61, this compound excitation salient pole pair will produce magnetic attraction to the permanent magnet 145 of which the magnetic polarity of external section is S and the magnetic polarity of internal section is N on the rotor cantilever, and meanwhile, this compound excitation salient pole pair will produce magnetic thrust to the permanent magnet of which the magnetic polarity of external section is N and the magnetic polarity of internal section is S on the rotor cantilever. Under the action mechanism of "attracting rear permanent magnet while repelling front permanent magnet", this compound excitation salient pole pair forms rotating torque of the rotor. When the permanent magnet of which the magnetic polarity of external section is S and the magnetic polarity of internal section is N is located between the upper and lower port faces of "C-shaped laminated iron core" of this compound excitation salient pole pair, as shown in FIG. 61, the compound flux of this compound excitation salient pole pair will form a closed magnetic loop with relatively small reluctance through the air gap of the upper curved surface of the permanent magnet, this permanent magnet, and the lower curved surface of the permanent magnet. At the moment when the permanent magnet is in alignment with the port faces of the "C-shaped" laminated iron core of the compound excitation salient pole pair, the motor driving device will suspend the excitation current input to the excitation coil L1 of this compound excitation salient pole pair, and start to input an excitation current to the excitation coil L2 of this compound excitation salient pole pair, so that the magnetic polarity of the upper and lower port faces of the "C-shaped" laminated iron core of this compound excitation salient pole pair reserves. Just because of the reversal change of the magnetic polarity of this compound excitation salient pole pair, this compound excitation salient pole pair changes quickly from attracting this permanent magnet before "the moment of alignment" to repelling this permanent magnet after "the moment of alignment". On the one hand, it effectively avoids the reasons for this compound excitation salient pole pair to produce negative torque; on the other hand, it makes this compound excitation salient pole pair always in the working state of "sucking the rear and pushing the front". In this embodiment, each compound excitation salient pole pair is mutually magnetically isolated, and the excitation coil of each compound excitation salient pole pair is independent, so the action process and action mechanism of the compound excitation salient pole pair and the permanent magnets on rotor discussed above are suitable for any compound excitation salient pole pair on the stator. The motor driving device controls the current switching of excitation coils L1 and L2 of each compound excitation salient pole pair on the stator in a real-time way, so that each compound excitation salient pole pair is always in the working state of "sucking the rear and pushing the front". In this embodiment, there are four compound excitation salient pole pairs on the stator seat, and six permanent magnets on the rotor cantilever support. Each time When the rotating shaft rotates by 30-degree central angle, two compound excitation salient pole pairs and two permanent magnets will be in alignment, namely the permanent magnets will be located between the upper and lower port faces of compound excitation salient pole pairs, thus realizing the continuous torque output of the rotating shaft of the motor.

In this embodiment, on the one hand, the motor dexterously imports the intrinsic permanent magnetic energy of permanent magnet assembly to the two port faces of the "C-shaped" laminated iron cores of excitation salient pole pair, so that the magnetic energy of permanent magnets could also participate in the process of acting on the permanent magnets on the rotor; on the other hand, in condition that excitation current is input into the coils L1 and L2 in turn, each compound excitation salient pole pair will be always in the working state of "sucking the rear and pushing the front", and this extends the working time, and thus further raises the energy efficiency of the motor.

Embodiment 13

Figure 63:
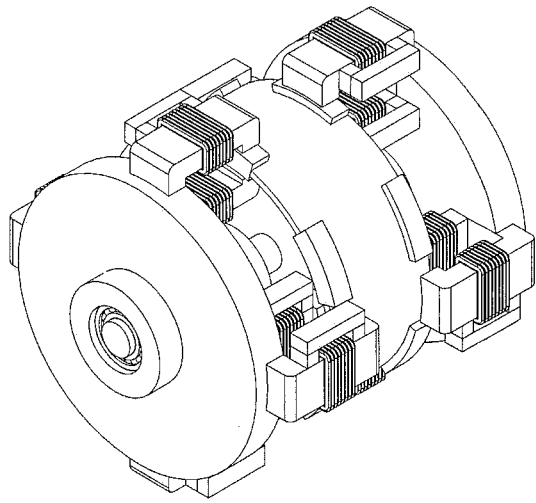
FIG. 63 shows the schematic diagram of the structure appearance of dual-cantilever bipolar permanent-magnet synergistic reluctance motor in the thirteenth embodiment of this invention.

This embodiment provides a permanent-magnet synergistic reluctance motor with dual-sided cantilever support for rotor and twin-coil-excitation dual-polarity compound excitation salient pole pair on the stator. Its appearance and structure are as shown in FIG. 63.

This embodiment is a special case of the twelfth embodiment, and it is of the structure of combining the couplings of two motors presented in the twelfth embodiment.

This embodiment adopts a dual-sided cantilever rotor support, and its structure is as shown in FIGS. 50-52. The magnetic polarity of neighboring permanent magnets on the same rotating surface of support are different.

In this embodiment, the eight compound excitation salient pole pairs on the motor stator are divided into two groups, which are completely symmetric and balanced at the left and right sides of the disc, with the disc in the rotor support as the symmetric surface.

In this embodiment, the action process and action mechanism between each compound excitation salient pole pair on the stator and each permanent magnet on the rotor as well as the control method of motor driving device are the same as those in the twelfth embodiment, and so won't be described repeatedly here.

This embodiment enhances the output power of motor, and correspondingly, strengthens the synergy effect of magnetic energy of permanent magnets.

Embodiment 14

Figure 66:
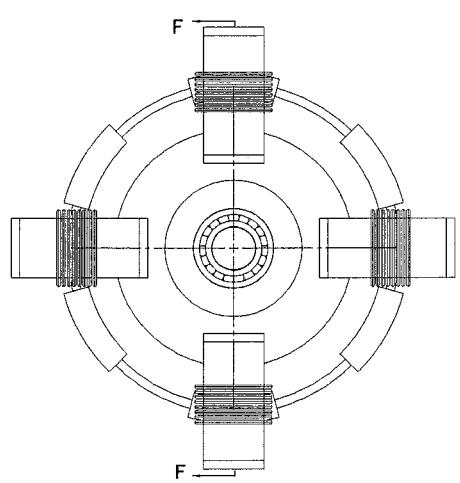
FIG. 66 shows the schematic diagram of the structure of single-cantilever bipolar permanent-magnet synergistic reluctance motor in the fourteenth embodiment of this invention.
Figure 67:
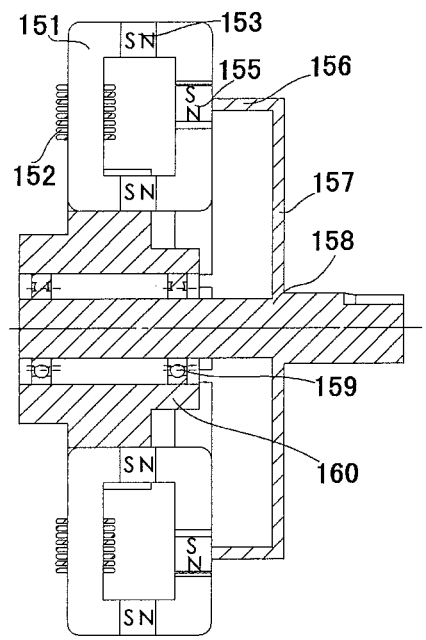
FIG. 67 shows the sectional view of the structure of single-cantilever bipolar permanent-magnet synergistic reluctance motor in the fourteenth embodiment of this invention (the sectional view in F-F direction of FIG. 66).
Figure 68:
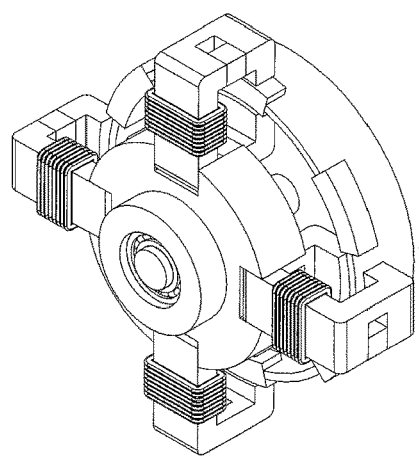
FIG. 68 shows the schematic diagram of the outside of single-cantilever bipolar permanent-magnet synergistic reluctance motor in the fourteenth embodiment of this invention.

This embodiment provides a permanent-magnet synergistic reluctance motor with single-sided cantilever support for rotor and twin-coil-excitation dual-polarity compound excitation salient pole pair on the stator. Its appearance and structure are as shown in FIGS. 66-68.

Figure 64:
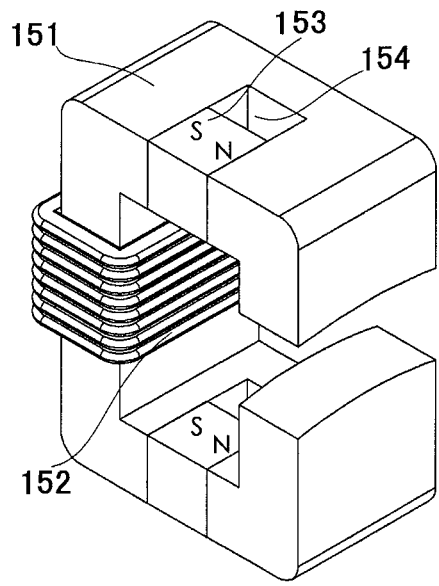
FIG. 64 shows the schematic diagram of the structure appearance of a monocoil dual-polarity compound excitation salient pole pair in this invention, namely two permanent magnets are embedded into the gap of the laminated iron core (the upper and lower port faces of magnet pole are opposite).
Figure 65:
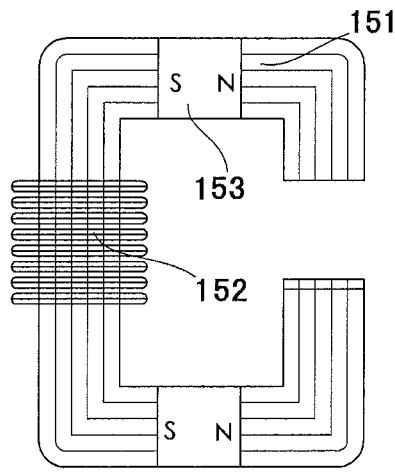
FIG. 65 shows the schematic diagram of the structure of "C-SHAPED" laminated iron core, permanent magnet and excitation coil of a monocoil dual-polarity compound excitation salient pole pair in this invention.

In this embodiment, stator consists of a stator seat 160 and four "compound excitation salient pole pairs". The four "compound excitation salient pole pairs" are placed respectively at the upside, downside, left side and right side, with a difference of 90-degree central angle existing mutually. In this embodiment, the compound excitation salient pole pair consists of one "C-SHAPED" laminated iron core 151, one excitation coil 152 and two permanent magnets 153, as shown in FIG. 64 and FIG. 65, the excitation coil 152 is wound around the vertical frame between the upper and lower frames of the laminated iron core 151, there is a gap at the upper and lower parallel frames of the laminated core respectively, the two permanent magnets 153 are embedded into the gap of the upper frame and the gap of the lower frame respectively, and the magnetic pole N/S of the permanent magnet 153 at the gap of the upper frame closely cling to the laminated iron core in the clockwise/anticlockwise direction, and similarly, the magnetic pole N/S of the permanent magnet at the gap of lower frame closely cling to the laminated iron core in the clockwise/anticlockwise direction, the gap 154 exists between the lateral sides of two permanent magnets and the laminated iron core, the two port faces of "C-shaped" laminated iron core are opposite at the upside and downside, and the two port faces are of curved surface.

If the excitation coil is not input an excitation current, the permanent magnet 153 at the gap of upper frame and the permanent magnet at the gap of lower frame of the "C-SHAPED" laminated iron core will be of the same polarity, so no magnetic potential will be formed on the two port faces of the "C-SHAPED" laminated iron core, and instead, only closed permanent magnet flux will be formed between the upper permanent magnet and laminated iron core. Similarly, permanent magnet flux will also be formed between lower permanent magnet and laminated iron core.

If positive excitation current is input into the excitation coil, the "C-SHAPED" laminated iron core will have N-pole magnetic potential on the upper port face and have S-pole magnetic potential on the lower port face, and meanwhile, for reason of electric excitation, the magnetic flux of the permanent magnet at the gap on the upper frame will be imported into the magnetic potential of the upper and lower port faces of the "C-SHAPED" laminated iron core, and form the compound superposition of the permanent magnet flux and excitation flux; When a reverse excitation current is input into the excitation coil, the "C-SHAPED" laminated iron core will have S-pole magnetic potential on the upper port face and N-pole magnetic potential on the lower port face, and meanwhile, for reason of electric excitation, the magnetic flux of the permanent magnet at the gap on lower frame is imported into the magnetic potential of the upper and lower port faces of the "C-SHAPED" laminated iron core, and form the compound superposition of the permanent magnet flux and excitation flux. If the direction of excitation current of excitation coil is changed, it will be available to obtain the compound excitation magnetic energy and potential with magnetic polarity changed on the upper and lower port faces of the "C-SHAPED" laminated iron core.

In this embodiment, the rotor is as shown in FIGS. 44-46, and the magnetic polarity of permanent magnet is as shown in FIG. 44. There is a difference of 60-degree central angle between the radial center lines of every permanent magnet, the magnetic polarity of two neighboring permanent magnets are different, and the radian of two magnet pole faces of each permanent magnet is consistent with the radiant of the two port faces of the "C-SHAPED" laminated iron core of the compound excitation salient pole pair. When the rotating shaft rotates, the permanent magnet fixed at the tail end of a rotor support could pass from between the ports of each compound excitation salient pole pair on the stator, and an air gap of the same clearance exists between the two magnet pole faces of each permanent magnet and the two port faces of each "C-SHAPED" laminated iron core.

The driving mechanism of this embodiment is that, when the direction of excitation current of excitation coil of the compound excitation salient pole pair is changed in turn, the magnetic polarity of the upper and lower port faces of the "C-SHAPED" laminated iron core of this compound excitation salient pole pair will be changed, thus forming dual-polarity compound excitation salient pole pair. When a positive excitation current is input into the excitation coil, the "C-SHAPED" laminated iron core of the compound excitation salient pole pair will present N-pole/S-pole magnetic potential on the upper/lower port face, as shown in FIG. 67. This compound excitation salient pole pair will produce magnetic attractive force to the permanent magnet 155 of which the magnetic polarity of external section is S and the magnetic polarity of internal section is N on the rotor cantilever, and meanwhile, this compound excitation salient pole pair will produce magnetic thrust to the permanent magnet of which the magnetic polarity of external section is N and the magnetic polarity of internal section is S on the rotor cantilever. Under the action mechanism of "attracting rear permanent magnet while repelling front permanent magnet", this compound excitation salient pole pair forms rotating torque of the rotor. When the permanent magnet of which the magnetic polarity of external section is S and the magnetic polarity of internal section is N is located between the upper and lower port faces of "C-shaped laminated iron core" of this compound excitation salient pole pair, the compound flux of this compound excitation salient pole pair will form a closed magnetic loop with relatively small reluctance through the air gap of the upper curved surface of the permanent magnet, this permanent magnet, and the lower curved surface of the permanent magnet. At the moment when the permanent magnet is in alignment with the port faces of the "C-shaped" laminated iron core of the compound excitation salient pole pair, the motor driving device will change the direction of excitation current of excitation coil of this compound excitation salient pole pair, so that the magnetic polarity of the upper and lower port faces of the "C-shaped" laminated iron core of this compound excitation salient pole pair reserves. Just because of the reversal change of the magnetic polarity of this compound excitation salient pole pair, this compound excitation salient pole pair changes quickly from attracting this permanent magnet before "the moment of alignment" to repelling this permanent magnet after "the moment of alignment". On the one hand, it effectively avoids the reasons for this compound excitation salient pole pair to produce negative torque; on the other hand, it makes this compound excitation salient pole pair always in the working state of "sucking the rear and pushing the front".

In this embodiment, each compound excitation salient pole pair is mutually magnetically isolated, and the excitation coil of each compound excitation salient pole pair is independent, so the action process and action mechanism of the compound excitation salient pole pair and the permanent magnets on rotor discussed above are suitable for any compound excitation salient pole pair on the stator. The motor driving device controls the current direction switching of excitation coils of each compound excitation salient pole pair on the stator in a real-time way, so that each compound excitation salient pole pair is always in the working state of "sucking the rear and pushing the front". In this embodiment, there are four compound excitation salient pole pairs on the stator seat, and six permanent magnets on the rotor cantilever support. Each time When the rotating shaft rotates by 30-degree central angle, two compound excitation salient pole pairs and two permanent magnets will be in alignment, namely the permanent magnets will be located between the upper and lower port faces of compound excitation salient pole pairs, thus realizing the continuous torque output of the rotating shaft of the motor.

Embodiment 15

This embodiment provides a permanent-magnet synergistic reluctance motor with single-sided cantilever support for rotor and twin-coil-excitation unipolar compound excitation salient pole pair on the stator.

The structure and appearance of the motor in this embodiment are similar to the fourteenth embodiment, as shown in FIG. 67 and FIG. 68.

Figure 69:
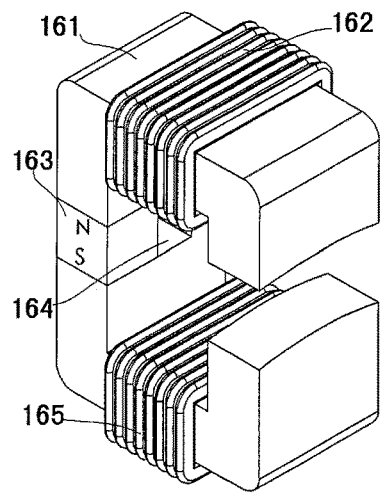
FIG. 69 shows the schematic diagram of the structure appearance of a twin-coil series-excitation unipolar compound excitation salient pole pair, namely one permanent magnet is embedded into the gap of the laminated iron core (the upper and lower port faces of magnetic pole are opposite).

The difference between this embodiment and the fourteenth embodiment rests with that, the compound excitation salient pole pair in this embodiment consists of one "C-SHAPED" laminated iron core 161, two excitation coil 162 and 165, and one permanent magnet 163, as shown in FIG. 69. There is one gap on the vertical frame of laminated iron core 161, one permanent magnet 163 is embedded into the gap on this frame, the end surface of magnetic pole N/S of the permanent magnet closely clings to the laminated iron core upward/downward, the gap 164 exists between the lateral side of the permanent magnet and the laminated iron core, the two excitation coils wind around the periphery of the upper and lower frames of this "C-SHAPED" laminated iron core respectively.

Figure 70:
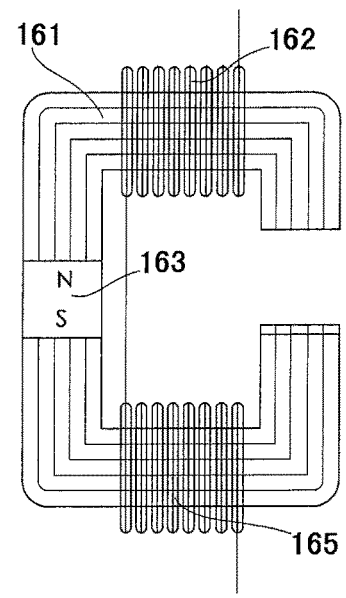
FIG. 70 shows the schematic diagram of the structure of "C-SHAPED" laminated iron core, permanent magnet, series twin-coil in the twin-coil series-excitation unipolar compound excitation salient pole pair in this invention.

In this embodiment, the two excitation coils of compound excitation salient pole pair are connected in series, as shown in FIG. 70. The method for winding of the two excitation coils makes the direction of excitation flux in electric excitation state consistent with that of the permanent magnet flux of permanent magnet 163.

When an excitation current is input into two excitation coils in series connection, N-pole/S-pole magnetic polarity will be formed on the upper/lower port face of the "C-SHAPED" laminated iron core, and similarly, for reason of electricity excitation, the magnetic line of original locally-closed permanent magnet will be opened, permanent flux will change the direction and be imported into the excitation flux, and magnetic potential of compound excitation will be formed between the upper and lower port faces of the laminated iron core.

In this embodiment, the action process and action mechanism between each compound excitation salient pole pair on the stator and each permanent magnet on the rotor as well as the control method of motor driving device are the same as those in the ninth embodiment, and so won't be described repeatedly here.

Embodiment 16

Figure 77:
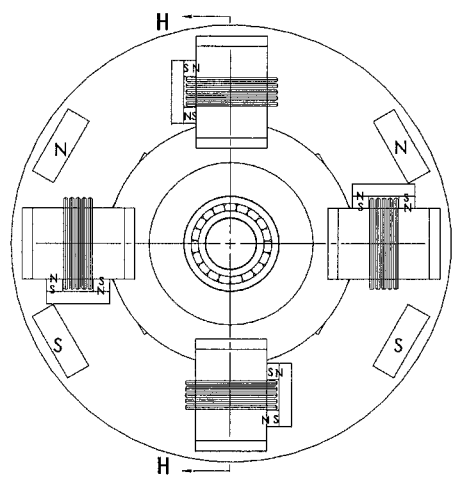
FIG. 77 shows the schematic diagram of the structure of the unipolar permanent-magnet synergistic reluctance motor with permanent magnet set up on single lateral side of the disc-shaped rotor support in the fifteenth embodiment of this invention.
Figure 78:
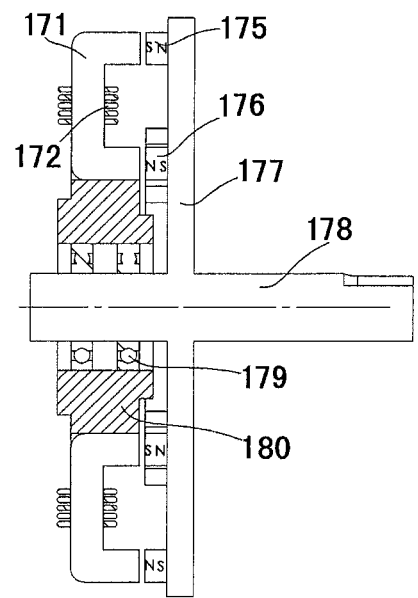
FIG. 78 shows the sectional view of the structure of the unipolar permanent-magnet synergistic reluctance motor with permanent magnet set up on single lateral side of the disc-shaped rotor support in the fifteenth embodiment of this invention (the sectional view in H-H direction of FIG. 77).

This embodiment provides a permanent-magnet synergistic reluctance motor with single-sided cantilever support for rotor and unipolar compound excitation salient pole pair on the stator. Its structure and appearance are as shown in FIGS. 76-78.

Figure 71:
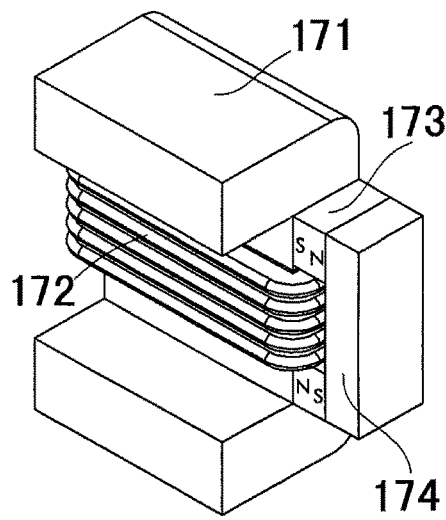
FIG. 71 shows the schematic diagram of the structure of a monocoil-excitation unipolar compound excitation salient pole pair (the port faces of magnetic pole are in the same direction).
Figure 72:
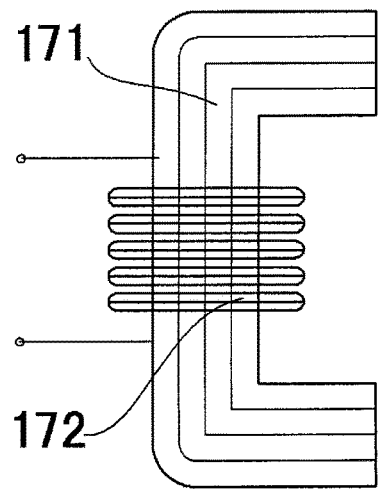
FIG. 72 shows the schematic diagram of the structure of "U-SHAPED" laminated iron core and excitation coil of a monocoil-excitation unipolar compound excitation salient pole pair.

In this embodiment, the stator consists of a stator seat 180 and four "compound excitation salient pole pairs", which are set up at set up at the upside, downside, left side and right side respectively, with a distance of 90-degree central angle existing mutually. Every compound excitation salient pole pair here consists of one "U-SHAPED" laminated iron core, one excitation coil and one permanent magnet, as shown in FIG. 71 and FIG. 72. The port faces of two salient poles of this "U-shaped" laminated iron core are in the same direction. The excitation coil is wound around the periphery of the frame of the "U-shaped" laminated iron core, the magnetic pole S and magnetic pole N of the permanent magnet assembly cross the excitation oil respectively, and the magnetic pole S and magnetic pole N of the permanent magnet assembly closely cling to the laminated section of the "C-shaped" laminated iron core.

The rotor of this embodiment is as shown in FIG. 73-75. The rotor support is disc-shaped, and twelve permanent magnets are set up at one lateral side of the magnetic disc with the axial line of the rotating shaft as a symmetric axial line, and where, six permanent magnets are set up at the inner ring, and six at the outer ring, and the interval between inner-ring permanent magnets is equal, so is the case between outer-ring permanent magnets. The disc 177 is magnetic, so the inner-ring permanent magnet 176 and an outer-ring permanent magnet 75 set up on the same radial line form one permanent magnet salient pole pair, the magnetic polarity of two neighboring permanent magnet salient pole pairs are different, and the distance between two salient poles of each permanent magnet salient pole pair is the same as that between the two salient poles of the excitation salient pole pair on the stator. When the rotating shaft rotates, each permanent magnet salient pole pair on the lateral side of the disc will sweep over each excitation salient pole pair on the stator in turn, and an air gap will be formed between the port face of each permanent magnet salient pole pair and the port face of each excitation salient pole pair on the lateral side of the disc.

The main difference between this embodiment and the ninth embodiment rests with that, the permanent magnet on the rotor support in the ninth embodiment is changed to "permanent magnet salient pole pair", and each permanent magnet salient pole pair consists of two permanent magnets and magnetic disc. As shown in FIG. 78, the magnetic potential between two salient poles of the "U-SHAPED" laminated iron core 171 of compound excitation salient pole pair on the stator forms a closed magnetic circuit through air gap, disc outer-ring permanent magnet 175, magnetic disc 177, disc inner-ring permanent magnet 176, and an air gap.

The operating mechanism and drive control method of this embodiment are the same as the ninth embodiment, and so won't be described repeatedly here.

Embodiment 17

This embodiment provides a permanent-magnet synergistic reluctance motor with dual-sided cantilever support for rotor and monocoil-excitation unipolar compound excitation salient pole pair on the stator. Its structure and appearance are as shown in FIGS. 82-84.

Figure 79:
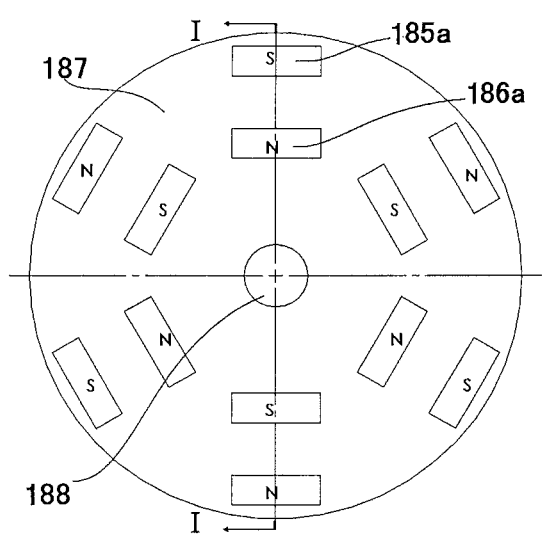
FIG. 79 shows the schematic diagram of the structure of the disc-shaped rotor support and the permanent magnet in the sixteenth embodiment of this invention.
Figure 80:
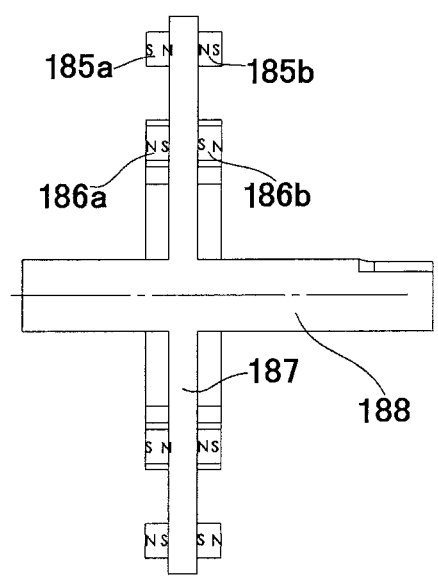
FIG. 80 shows the sectional view of the structure of the disc-shaped rotor support and the permanent magnet in the sixteenth embodiment of this invention (the sectional view in I-I direction of FIG. 79).
Figure 81:
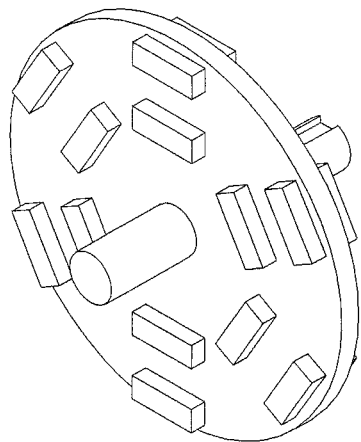
FIG. 81 shows the schematic diagram of the appearance of the disc-shaped rotor support and the permanent magnet in the sixteenth embodiment of this invention.

In this embodiment, twelve permanent magnets are set up respectively at both sides of magnetic disc of the rotor, as shown in FIGS. 79-81. The twelve permanent magnets at each side are set up by an inner ring and an outer ring with the axial line of the rotating shaft as a symmetric axial line, and the interval between inner-ring permanent magnets is equal, so is the case between outer-ring permanent magnets. The disc is magnetic, so the inner-ring permanent magnet 186a and an outer-ring permanent magnet 185a set up on the same radial line form one permanent magnet salient pole pair, the magnetic polarity of two neighboring permanent magnet salient pole pairs are different, and the distance between two salient poles of each permanent magnet salient pole pair is the same as that between the two salient poles of the excitation salient pole pair on the stator. When the rotating shaft rotates, each permanent magnet salient pole pair on both lateral sides of the disc will sweep over each compound excitation salient pole pair on the stator in turn, and an air gap will be formed between the port face of each permanent magnet salient pole pair and the port face of each compound excitation salient pole pair on both lateral sides of the disc.

Figure 82:
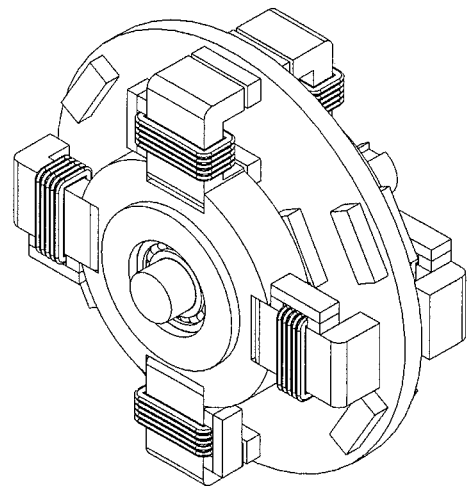
FIG. 82 shows the schematic diagram of the appearance of the unipolar permanent-magnet synergistic reluctance motor with permanent magnets set up on both lateral sides of the disc-shaped rotor support in the seventeenth embodiment of this invention.
Figure 83:
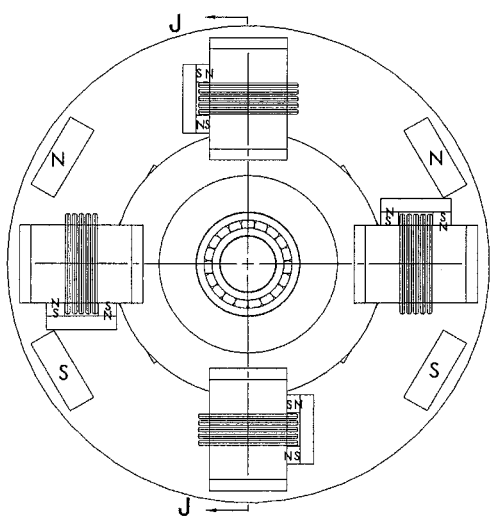
FIG. 83 shows the schematic diagram of the structure of the unipolar permanent-magnet synergistic reluctance motor with permanent magnets set up on both lateral sides of the disc-shaped rotor support in the seventeenth embodiment of this invention.
Figure 84:
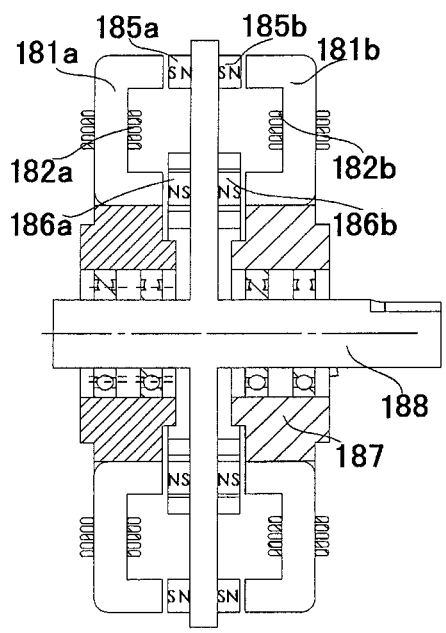
FIG. 84 shows the sectional view of the structure of the unipolar permanent-magnet synergistic reluctance motor with permanent magnets set up on both lateral sides of the disc-shaped rotor support in the seventeenth embodiment of this invention (the sectional view in J-J direction of FIG. 83).

On the stator in this embodiment, there are total eight compound excitation salient pole pairs, which are set up at both sides of rotor disc, with four forming one group, as shown in FIG. 82 and FIG. 84.

This embodiment is a special case of the sixteenth embodiment, and it is of the structure of combining the couplings of two motors presented in the sixteenth embodiment.

The operating mechanism and drive control method of this embodiment are the same as the ninth embodiment, and so won't be described repeatedly here.

Embodiment 18

Figure 87:
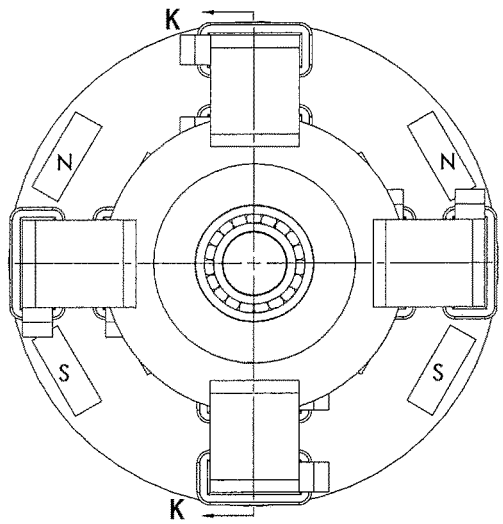
FIG. 87 shows the schematic diagram of the structure of the bipolar permanent-magnet synergistic reluctance motor with permanent magnet set up on single lateral side of the disc-shaped rotor support in the eighteenth embodiment of this invention.
Figure 88:
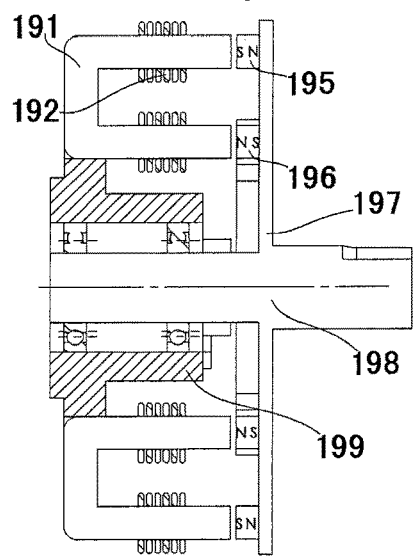
FIG. 88 shows the sectional view of the structure of the bipolar permanent-magnet synergistic reluctance motor with permanent magnet set up on single lateral side of the disc-shaped rotor support in the eighteenth embodiment of this invention (the sectional view in K-K direction of FIG. 87).
Figure 89:
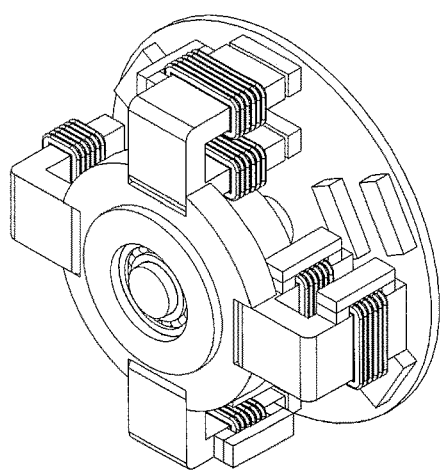
FIG. 89 shows the schematic diagram of the appearance structure of the bipolar permanent-magnet synergistic reluctance motor with permanent magnet set up on single lateral side of the disc-shaped rotor support in the eighteenth embodiment of this invention.

This embodiment provides a permanent-magnet synergistic reluctance motor with single-sided cantilever support for rotor and twin-coil dual-polarity compound excitation salient pole pair on stator. Its structure and appearance are as shown in FIGS. 87-89.

Figure 85:
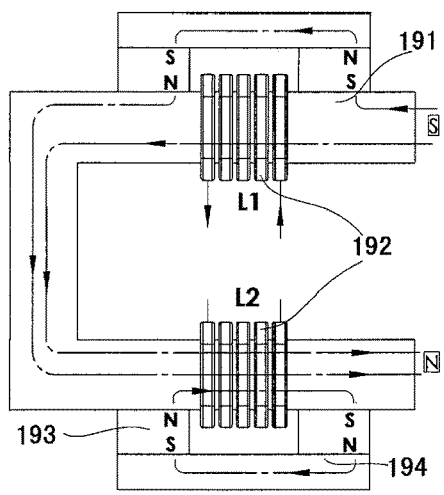
FIG. 85 shows the schematic diagram of a polarity state of compound excitation of twin-coil-excitation dual-polarity compound excitation salient pole pair (the port faces of magnetic poles are in the same direction).
Figure 86:
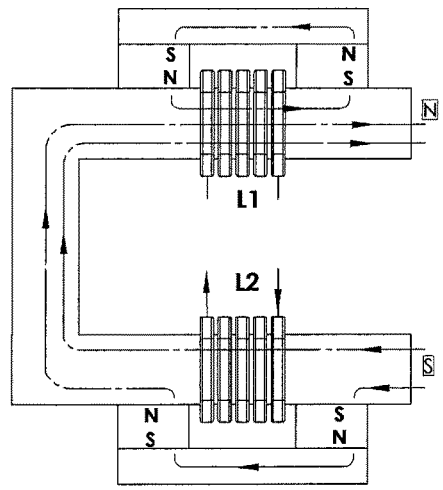
FIG. 86 shows the schematic diagram of another polarity state of compound excitation of twin-coil-excitation dual-polarity compound excitation salient pole pair.

In this embodiment, the structure of compound excitation salient pole pair on the stator is as shown in FIG. 85 and FIG. 86. The port faces of two salient poles of this "U-SHAPED" laminated iron core 191 are in the same direction, two groups of excitation coil 192 are wound around the periphery of two parallel frames of the "U-shaped" laminated iron core, the magnetic pole S and magnetic pole N of two permanent magnet assemblies cross excitation oil respectively, and the magnetic pole S and magnetic pole N of two permanent magnet assemblies closely cling to the laminated section of the "U-shaped" laminated iron core. As shown in FIG. 85, when an excitation current is input into the excitation coil L1, and not input into the excitation coil L2, the originally closed permanent magnetic line of the permanent magnet assembly bridged over both ends of L1 will be partially or fully opened, and imported into the excitation flux circuit, while the permanent magnet bridged over both ends of L2 will still maintain its permanent closed magnetic loop. At this moment, the compound magnetic potential of permanent magnetic potential and excitation magnetic potential is presented on the upper and lower port faces of salient poles of the "U-SHAPED" laminated iron core, and here, the upper/lower port face of the salient pole of "U-SHAPED" laminated iron core presents S/N pole. Similarly, as shown in FIG. 86, when an excitation current is input into the excitation coil L2 and not input into the excitation coil L1, the upper/lower port face of salient pole of "U-SHAPED" laminated iron core will present N/S pole. If excitation current is alternatively input into L1 and L2, the compound magnetic potential with alternative change of magnetic polarity will be obtained on the upper and lower port faces of salient poles of "U-SHAPED" laminated iron core.

In this embodiment, the setting of rotor disc and the permanent magnet is as shown in FIGS. 69-71.

The operating mechanism and drive control method of this embodiment are the same as the twelfth embodiment, and so won't be described repeatedly here.

Embodiment 19

This embodiment provides a permanent-magnet synergistic reluctance motor with dual-sided cantilever support for rotor and twin-coil-excitation dual-polarity compound excitation salient pole pair on the stator. Its appearance and structure are as shown in FIGS. 90-92.

This embodiment is a special case of the eighteenth embodiment, and its difference from the eighteenth embodiment rests with that, twelve permanent magnets are set up respectively at both sides of the magnetic disc of the rotor, and the setting form of permanent magnets at each side is the same, namely it is of the structure of combining the couplings of two motors presented in the tenth embodiment.

Figure 90:
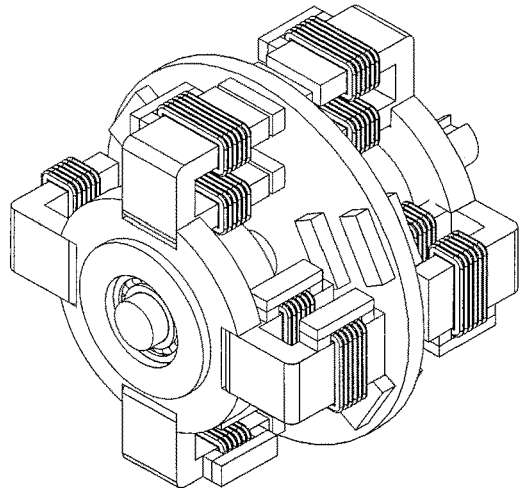
FIG. 90 shows the schematic diagram of the structure appearance of the bipolar permanent-magnet synergistic reluctance motor with permanent magnets set up on both lateral sides of the disc-shaped rotor support in the nineteenth embodiment of this invention.

On the stator in this embodiment, there are total eight compound excitation salient pole pairs, which are set up at both sides of rotor disc with four forming one group, as shown in FIG. 90 and FIG. 92.

The operating mechanism and drive control method of this embodiment are the same as the eleventh embodiment, and so won't be described repeatedly here.

For the sake of simple description and clear graphic representation, the abovementioned embodiments of this invention only adopt four compound excitation salient pole pairs on the stator, and six permanent magnets or permanent magnet salient pole pairs on corresponding rotor support. However, the embodiment of this invention is not limited to this "four-six" combination structure. If the number of compound excitation salient pole pair on the stator is N, and the number of permanent magnet or "permanent magnet salient pole pair" on the rotor is M, N and M will meet the relationship expression $M=kN$, in which, M is an even number equal to or bigger than 2, and N is a natural number equal to or bigger than 2. When N is an odd number, k will be an even number; when N is an even number, k will be a natural number, and the ratio of M/N is not an integer.

The actual motor product provided by this invention has the following characteristics and application fields:

1. The product is of light weight, small volume, big torque, and is reliable and easy to control. It is especially applicable to the occasions having relatively high requirements on the volume, weight and power density of motors, as well as the occasions having higher requirements on security such as aviation and national defense, etc.

2. The product has no electric brush and sparkle interference, has small volume, light weight and long service life, and especially, it adopts safe and low-voltage power supply. It is especially applicable to hand-held electric tools and equipment, as well as to the flowing operation in bad climatic environment. It could completely avoid casualties induced by electric shock.

3. Featured by simple structure, reliability, low price, energy conservation, this product is especially suitable for general power machinery, electric appliances for industry and agriculture, commerce and domestic life, and it could raise the quality and property of products and equipment.

4. With big torque and wide-range constant torque at low rotation speed, the product has low consumption, could save energy and raise the endurance ability of vehicles. It is especially suitable to be used as vehicle driving motor for electric power-assisted vehicles and electric cars. The driving motor bringing about high performance to electric cars will replace the existing AC frequency-variable motors, give an impetus to the fast development progress of electric cars, and obtain very high economic return and social benefits.

The invention claimed is:

1. An AC permanent magnet switched reluctance motor, comprising:
   a stator; and
   a rotor,
   wherein the stator has multiple excitation salient pole pairs, which are fixed on a stator seat in a balanced way, all excitation salient pole pairs are mutually magnet-isolated, and each excitation salient pole pair is excited and controlled by an independent excitation coil;
      each excitation salient pole pair includes a C-SHAPED laminated iron core, two excitation coils, and two permanent magnet assemblies or two permanent magnets;
      the laminated iron core has two salient pole port faces that are opposite to each other, and the two excitation coils are each wound a periphery of a respective one of two parallel frames of the laminated iron core;
      each permanent magnet or permanent magnet assembly has two magnetic pole faces that cling to a laminated section of the laminated iron core;
      each permanent magnet is embedded into a respective gap of the laminated iron core, the two magnetic pole faces of each permanent magnet cling to a laminated section of the respective gap of the laminated iron core; each gap exists between a lateral side of each permanent magnet and the laminated iron core;
      a winding direction of each excitation coil is configured such that, when an excitation current is input into the excitation coil, (1) a direction of excitation flux generated by the laminated iron core is consistent with a direction of a permanent magnet flux of the corresponding permanent magnet assembly or the permanent magnet, and (2)
      the excitation flux forces closed permanent magnet flux to open, and imports the permanent magnet flux into a main loop of the excitation flux, forming a compound excitation magnetic potential on the port faces of the laminated iron core;
      the rotor includes a rotating shaft, a rotor support and multiple permanent magnets, a center of the rotor support is fixed with the rotating shaft, the multiple permanent magnets are fixed on the rotor support in a balanced way, and magnetic polarities of neighboring permanent magnets are different,
      when the rotating shaft rotates, magnet port faces of the multiple permanent magnets on the rotor support align with port faces of each excitation salient pole pair on the stator one by one;
      during alignment of each permanent magnet, the compound excitation magnetic potential on port faces of the corresponding excitation salient pole pair forms a shortest closed magnetic loop with the permanent magnet through an air gap.

2. The AC permanent magnet switched reluctance motor according to claim 1,
   wherein
      the rotor support includes a disc and a cylinder; an edge of one end of the cylinder is fixedly connected with an outside edge of the disc, forming a bowl-shaped entity;
      a center of the disc is fixedly connected with the rotating shaft, a plane of the disc is vertical to an axial line of the rotating shaft, an axial line of the cylinder is superposed with the axial line of the rotating shaft, and the multiple permanent magnets are fixed at an end of another end of the cylinder in a balanced way;

when the rotating shaft rotates, all the permanent magnets fixed at the edge of one end of the cylinder pass between ports of each excitation salient pole pair, and an air gap is formed between two magnetic pole faces of each permanent magnet and the port faces of the excitation salient pole pairs; when a permanent magnet is located between two port faces of an excitation salient pole pair, a closed magnetic loop with an air gap is formed between the permanent magnet and the excitation salient pole pair;

or wherein, the rotor support includes a disc and a cylinder; an inner wall of a middle part of the cylinder is fixedly connected with an outside edge of the disc, forming a same-bottom, dual-direction, opening and bowl-shaped entity;

a center of the disc is fixedly connected with the rotating shaft, a plane of the disc is vertical to an axial line of the rotating shaft, an axial line of the cylinder is superposed with the axial line of the rotating shaft, the multiple permanent magnets are fixed at edges of two ends of the cylinder in a balanced way, and the magnetic polarities of neighboring permanent magnets at a same end edge are different, the magnetic polarities of neighboring permanent magnets at different end edges are the same;

the multiple excitation salient pole pairs are divided into two groups, and placed at both sides of the disc of the rotor support, and the two port faces of all excitation salient pole pairs are opposite;

when the rotating shaft rotates, all the permanent magnets fixed at edges of two ends of the cylinder pass between ports of all excitation salient pole pairs at both sides of the disc, and an air gap is formed between two magnetic pole faces of each permanent magnet and the port faces of the corresponding excitation salient pole pair; when a permanent magnet is located between two port faces of an excitation salient pole air, a closed magnetic loop with an air gap is formed between the permanent magnet and the excitation salient pole pair;

or wherein, the rotor support includes a disc and a cylinder; an inner wall of a middle part of the cylinder is fixedly connected with an outside edge of the disc, forming a same-bottom, dual-direction, opening and bowl-shaped entity;

a center of the disc is fixedly connected with the rotating shaft, a plane of the disc is vertical to an axial line of the rotating shaft, and an axial line of the cylinder is superposed with the axial line of the rotating shaft; the multiple permanent magnets are fixed at edges of two ends of the cylinder in a balanced way, and the magnetic polarity of neighboring permanent magnets at a same end edge is different, a difference of central angle α exists between permanent magnets at different ends;

the multiple excitation salient pole pairs are divided into groups, and placed at both sides of the disc of the rotor support, and the two port faces of all excitation salient pole pairs are opposite;

when the rotating shaft rotates, all the permanent magnets fixed at edges of two ends of the cylinder pass between ports of all excitation salient pole pairs at both sides of the disc, and an air gap is formed between two magnetic pole faces of each permanent magnet and the port faces of the corresponding excitation salient pole pair; when a permanent magnet is located between two port faces of an excitation salient pole air, a closed magnetic loop with an air gap is formed between the permanent magnet and the excitation salient pole pair;

or wherein, the rotor support includes a disc and an edge-folded cylinder, an inner wall of a central part of the edge-folded cylinder is fixedly connected with an outside edge of disc, forming a same-bottom dual-way bowl-rim inner-edge-folded entity;

a center of the disc is fixedly connected with the rotating shaft; a plane of the disc is vertical to an axial line of the rotating shaft; an axial line of the edge-folded cylinder is superposed with the axial line of the rotating shaft, the edge-folded cylinder has inner fold-edges, edge-folded surfaces of the edge-folded cylinder are vertical to the axial line of the rotating shaft; the multiple permanent magnets are divided into two groups and fixed at the fold-edges at both ends of the edge-folded cylinder in a balanced way; the multiple excitation salient pole pairs are divided into two groups, and placed at two sides of the disc of the rotor support; the two port faces of all excitation salient pole pairs are opposite at the two sides;

when the rotating shaft rotates, all permanent magnets fixed at the fold-edges of both ends of the edge folded cylinder pass between the port faces of all C-shaped excitation salient pole pairs at both sides of the disc, and an air gap is formed between the two magnetic pole faces of a permanent magnet and the port faces of the corresponding excitation salient pole pair.

3. The AC permanent magnet switched reluctance motor according to claim 1, wherein, each excitation salient pole pair includes two permanent magnet assemblies; a direction of excitation magnetic field is the same as that of a magnetic field formed by permanent magnet assemblies set up in parallel connection, the two permanent magnet assemblies and the corresponding compound magnet fields formed under excitation function of respective excitation coils set up in parallel are set up in opposite direction, the magnetic pole S and the magnetic pole N of each of the permanent magnet assemblies cross over the respective excitation coil, and cling to a laminated section of the laminated iron core;

and wherein the rotor support includes a disc and a cylinder; an edge of one end of the cylinder is fixedly connected with an outside edge of the disc, forming a bowl-shaped entity;

a center of the disc is fixedly connected with the rotating shaft, a plane of the disc is vertical to an axial line of the rotating shaft, an axial line of the cylinder is superposed with the axial line of the rotating shaft, and the multiple permanent magnets are fixed at the end of another end of the cylinder in a balanced way;

when the rotating shaft rotates, all the permanent magnets fixed at the edge of one end of the cylinder pass between ports of each excitation salient pole pair, and an air gap is formed between two magnetic pole faces of each permanent magnet and the port faces of the excitation salient pole pairs;

when a permanent magnet is located between two port faces of an excitation salient pole pair, a closed magnetic loop with an air gap is formed between the permanent magnet and the excitation salient pole pair;

or wherein, the rotor support includes a disc and a cylinder; an inner wall of a middle part of the cylinder is fixedly connected with an outside edge of the disc, forming a same-bottom, dual-direction, opening and bowl-shaped entity;

a center of the disc is fixedly connected with the rotating shaft, a plane of the disc is vertical to an axial line of the rotating shaft, and an axial line of the cylinder is superposed with the axial line of the rotating shaft; the multiple permanent magnets are fixed at edges of two ends of the cylinder in a balanced way, and the magnetic polarity of neighboring permanent magnets at a same end edge is different, the magnetic polarity of neighboring permanent magnets at different end edges is the same; the multiple excitation salient pole pairs are divided into two groups, and placed at both sides of the disc of the rotor support, and the two port of all excitation salient pole pairs are opposite;

when the rotating shaft rotates, all the permanent magnets fixed at edges of two ends of the cylinder pass between ports of all excitation salient pole pairs at both sides of the disc, and an air gap is formed between two magnetic pole faces of each permanent magnet and the port faces of the corresponding excitation salient pole pair; when a permanent magnet is located between two port faces of a excitation salient pole air, a closed magnetic loop with an air gap is formed between the permanent magnet and the excitation salient pole pair.

\* \* \* \* \*